United States Patent
Koizumi

(10) Patent No.: US 10,225,537 B2
(45) Date of Patent: Mar. 5, 2019

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Tatsuro Koizumi, Niiza (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/673,604

(22) Filed: Aug. 10, 2017

(65) Prior Publication Data
US 2018/0063499 A1 Mar. 1, 2018

(30) Foreign Application Priority Data
Aug. 24, 2016 (JP) ................. 2016-163772

(51) Int. Cl.
*H04N 9/64* (2006.01)
*H04N 5/232* (2006.01)
(Continued)

(52) U.S. Cl.
CPC ............. *H04N 9/646* (2013.01); *G06T 5/003* (2013.01); *G06T 5/50* (2013.01); *H04N 5/23229* (2013.01);
(Continued)

(58) Field of Classification Search
CPC .... H04N 9/646; H04N 9/045; H04N 5/23229; G06T 2207/10052; G06T 5/003; G06T 5/50
See application file for complete search history.

(56) References Cited

U.S. PATENT DOCUMENTS

| 2013/0076966 A1* | 3/2013 | Border | H04N 5/2254 348/345 |
| 2013/0107085 A1* | 5/2013 | Ng | H04N 5/3572 348/242 |

(Continued)

FOREIGN PATENT DOCUMENTS

JP 4752031 B2 8/2011

OTHER PUBLICATIONS

Georgiev et al. "Superresolution with Plenoptic Camera 2.0," Adobe Technical Report, Apr. 2009, pp. 1-9.

*Primary Examiner* — Nhan T Tran
(74) *Attorney, Agent, or Firm* — Carter, DeLuca, Farrell & Schmidt LLP

(57) ABSTRACT

The image processing apparatus according to an embodiment of the present invention corrects a color blur of a refocus image due to light field data. The image processing apparatus includes a generation unit configured to generate a refocus image for each channel at a virtual refocus position based on light field data including a plurality of channels whose wavelengths are different and optical characteristics for each channel of an optical system used to obtain the light field data. Further, the image processing apparatus includes a derivation unit configured to derive spatial frequency characteristics for each channel from the optical characteristics for each channel and the virtual refocus position and a correction unit configured to correct the refocus image for each channel so as to make sharpness uniform based on the spatial frequency characteristics for each channel.

10 Claims, 25 Drawing Sheets

(51) Int. Cl.
*G06T 5/00* (2006.01)
*H04N 9/04* (2006.01)
*G06T 5/50* (2006.01)

(52) U.S. Cl.
CPC ... *H04N 9/045* (2013.01); *G06T 2207/10052* (2013.01)

(56) References Cited

U.S. PATENT DOCUMENTS

| | | | |
|---|---|---|---|
| 2013/0229532 A1* | 9/2013 | Tsutsumi | H04N 17/002 348/187 |
| 2014/0028892 A1* | 1/2014 | Ng | G02B 3/0056 348/336 |
| 2014/0049666 A1* | 2/2014 | Tsutsumi | H04N 5/2254 348/239 |
| 2015/0130995 A1* | 5/2015 | Nishiyama | G06T 5/003 348/370 |
| 2016/0142615 A1* | 5/2016 | Liang | H04N 5/23212 348/222.1 |

* cited by examiner

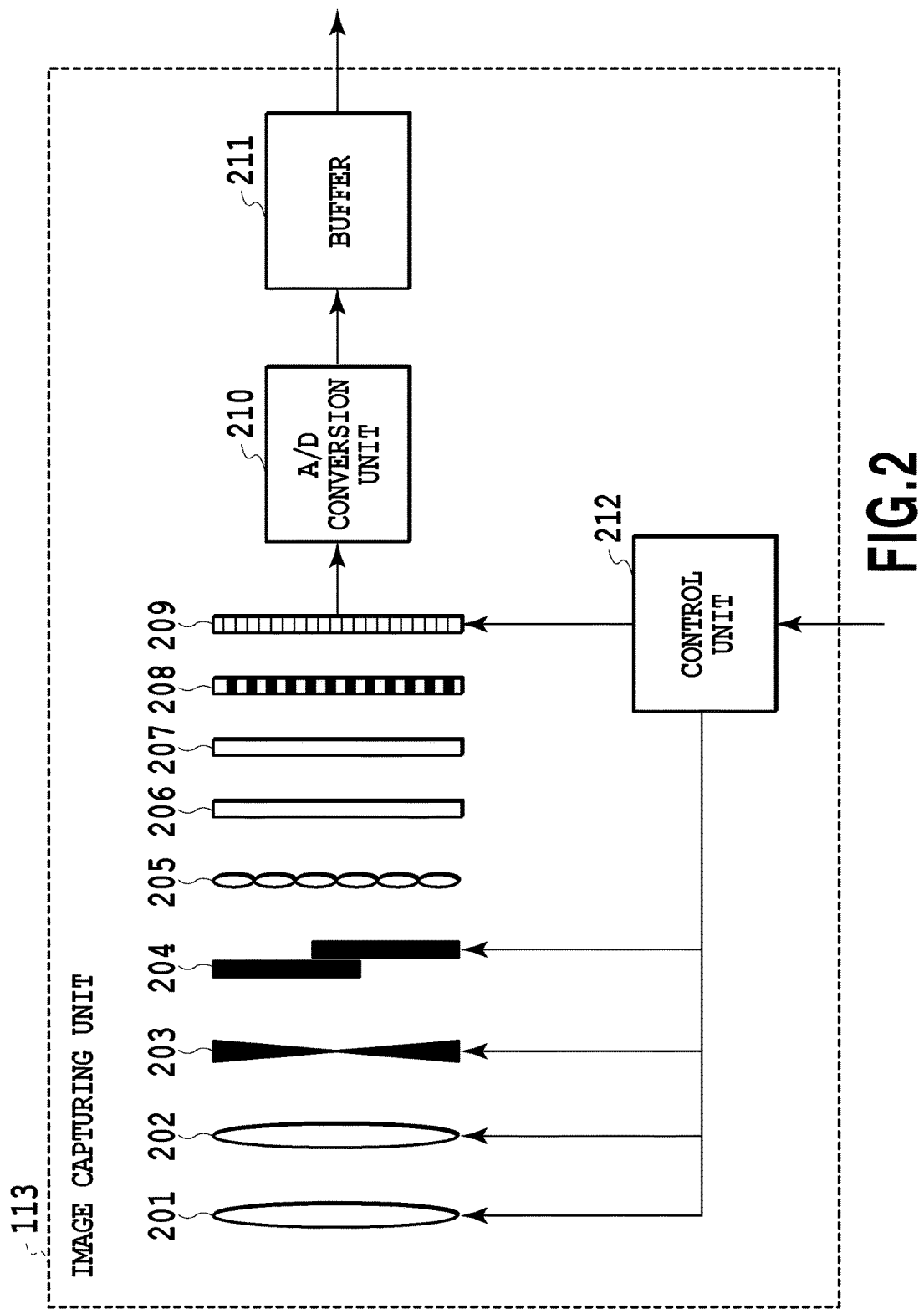

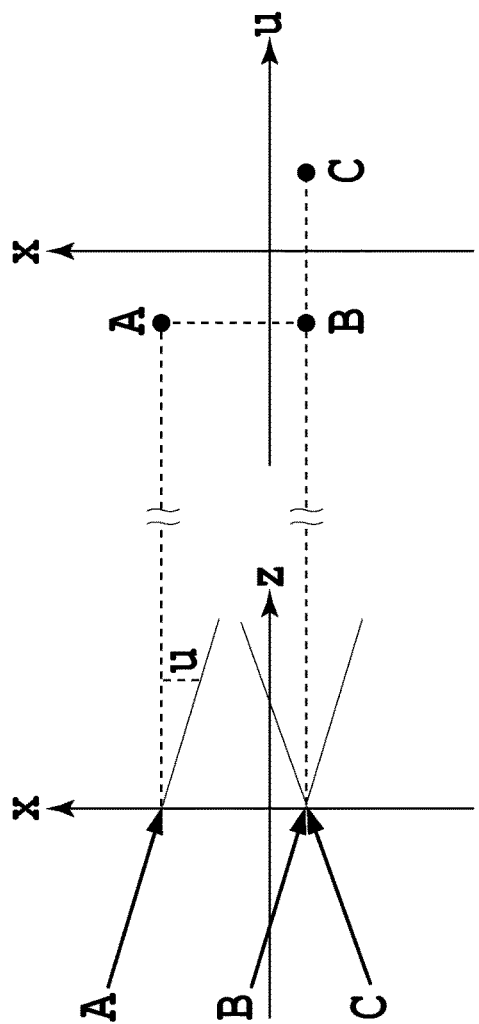
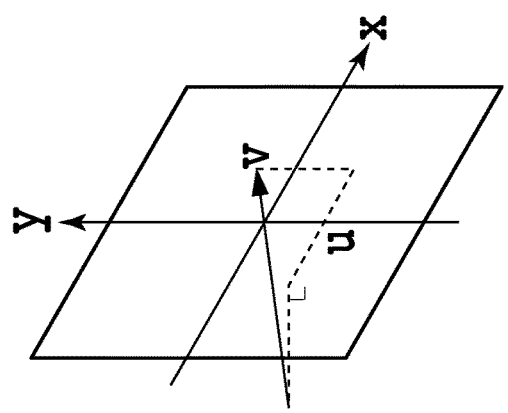
FIG.4A  FIG.4B  FIG.4C

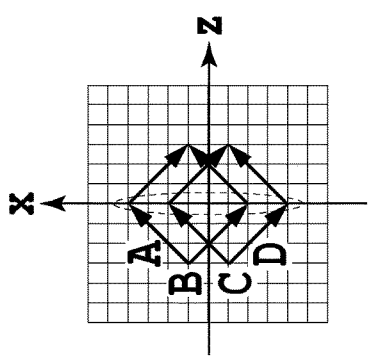
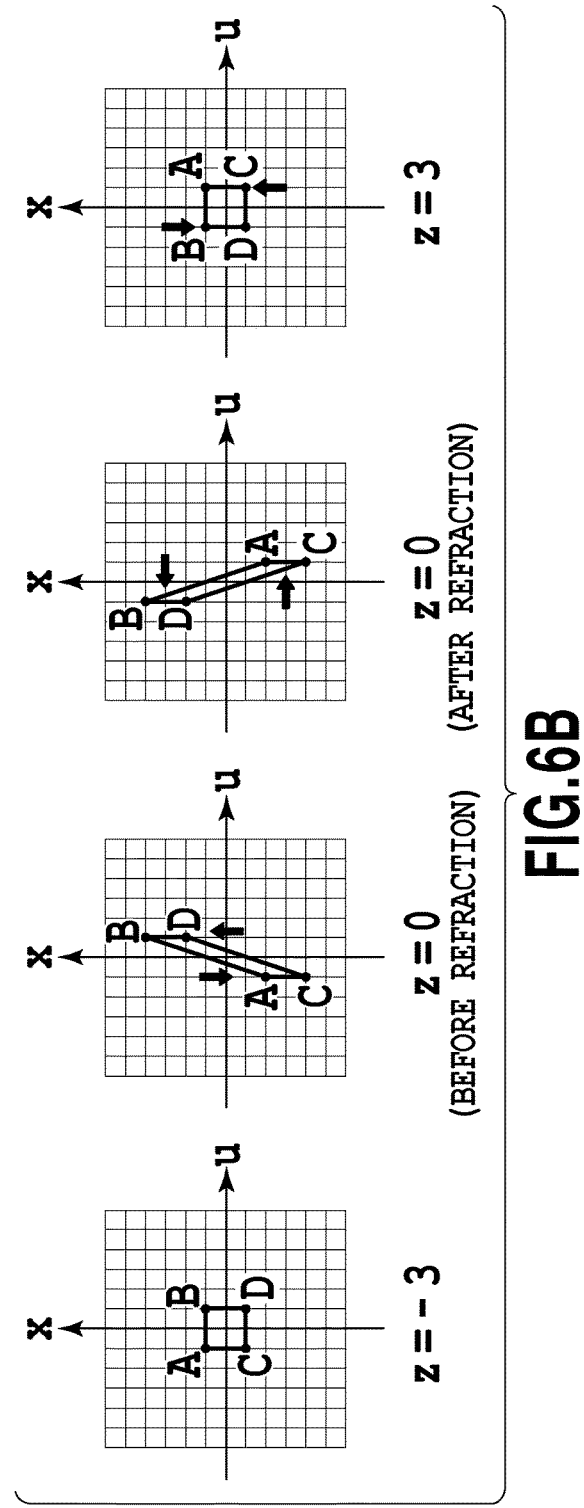
FIG.6A
FIG.6B

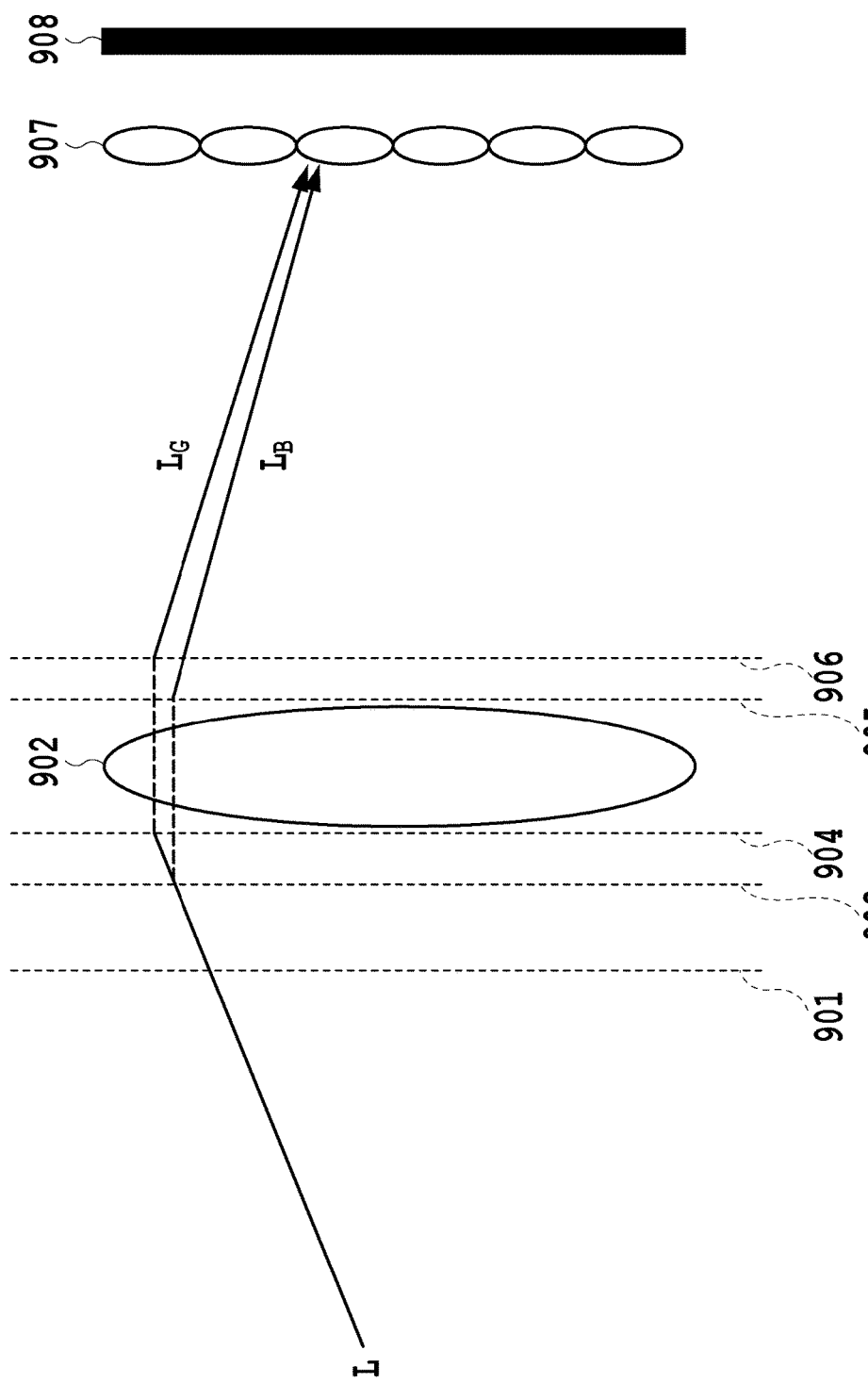

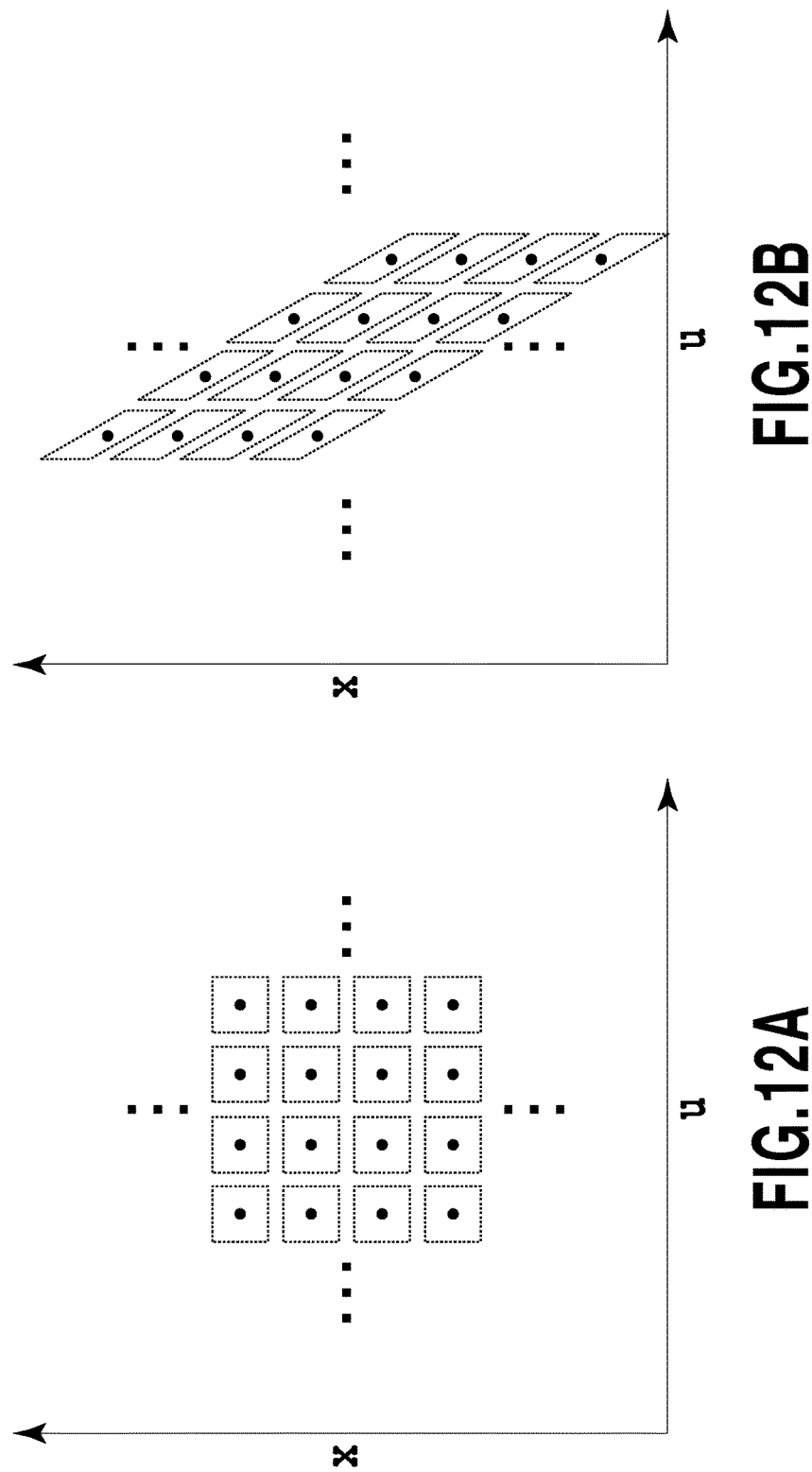

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to correction processing of a refocus image by light field data.

Description of the Related Art

In recent years, the technique called computational photography has been developing, which is capable of acquiring information (light field data) on the direction and intensity of a light ray and adjusting (refocusing) the focus position by image processing later by adding a new optical element to an optical system.

Use of this technique provides an advantage in that a failure in focus adjustment at the time of photographing can be made up by image processing because it is possible to perform focus adjustment after photographing. Further, there is also an advantage in that it is possible to obtain a plurality of images in which an arbitrary subject in the image is brought into focus from one photographed image by changing the image processing method, and therefore, it is possible to reduce the number of times of photographing.

As a device to acquire light field data, there is a plenoptic camera or the like in which a microlens array is arranged in the vicinity of an image capturing element of a digital camera including an optical system and an image capturing element. For a normal digital camera, deterioration of image quality due to chromatic aberration of a lens is problematic and this is also true with a plenoptic camera. As a method of reducing chromatic aberration in a plenoptic camera, a method of performing correction at the time of generating an image based on the characteristics of chromatic aberration obtained in advance has been disclosed (see Japanese Patent No. 4752031).

However, in the case where chromatic aberration correction is performed based on the method disclosed in Japanese Patent No. 4752031, the sharpness of each channel of a refocus image is different due to blurring resulting from an aperture of the microlens, and therefore, there is such a problem that a color blur occurs.

SUMMARY OF THE INVENTION

The image processing apparatus according to an embodiment of the present invention includes a generation unit configured to generate a refocus image for each channel at a virtual refocus position based on light field data including a plurality of channels whose wavelengths are different and optical characteristics for each channel of an optical system used to obtain the light field data. Further, the image processing apparatus includes: a derivation unit configured to derive spatial frequency characteristics for each channel from the optical characteristics for each channel and the virtual refocus position; and a correction unit configured to correct the refocus image for each channel so as to make sharpness uniform based on the spatial frequency characteristics for each channel.

Further features of the present invention will become apparent from the following description of exemplary embodiments with reference to the attached drawings.

BRIEF DESCRIPTION OF THE DRAWINGS

FIG. 2 is a block diagram showing a configuration example of an image capturing unit of the first embodiment;

FIGS. 4A to 4C are each a diagram showing a representation method of a light field;

FIG. 6A and FIG. 6B are each a diagram showing an example of a light field of a light ray that propagates through an optical system;

FIG. 9 is a diagram for explaining chromatic aberration for a light ray;

FIG. 12A and FIG. 12B are diagrams showing a change of an integration range in a light field space due to chromatic aberration correction;

DESCRIPTION OF THE EMBODIMENTS

In the following, embodiments of the present invention are explained in detail with reference to the drawings. The following embodiments are merely exemplary and not intended to limit the present invention. Though all the drawings, the same symbol indicates the same component.

First Embodiment

<Entire Configuration of Image Capturing Apparatus>

Figure 1:
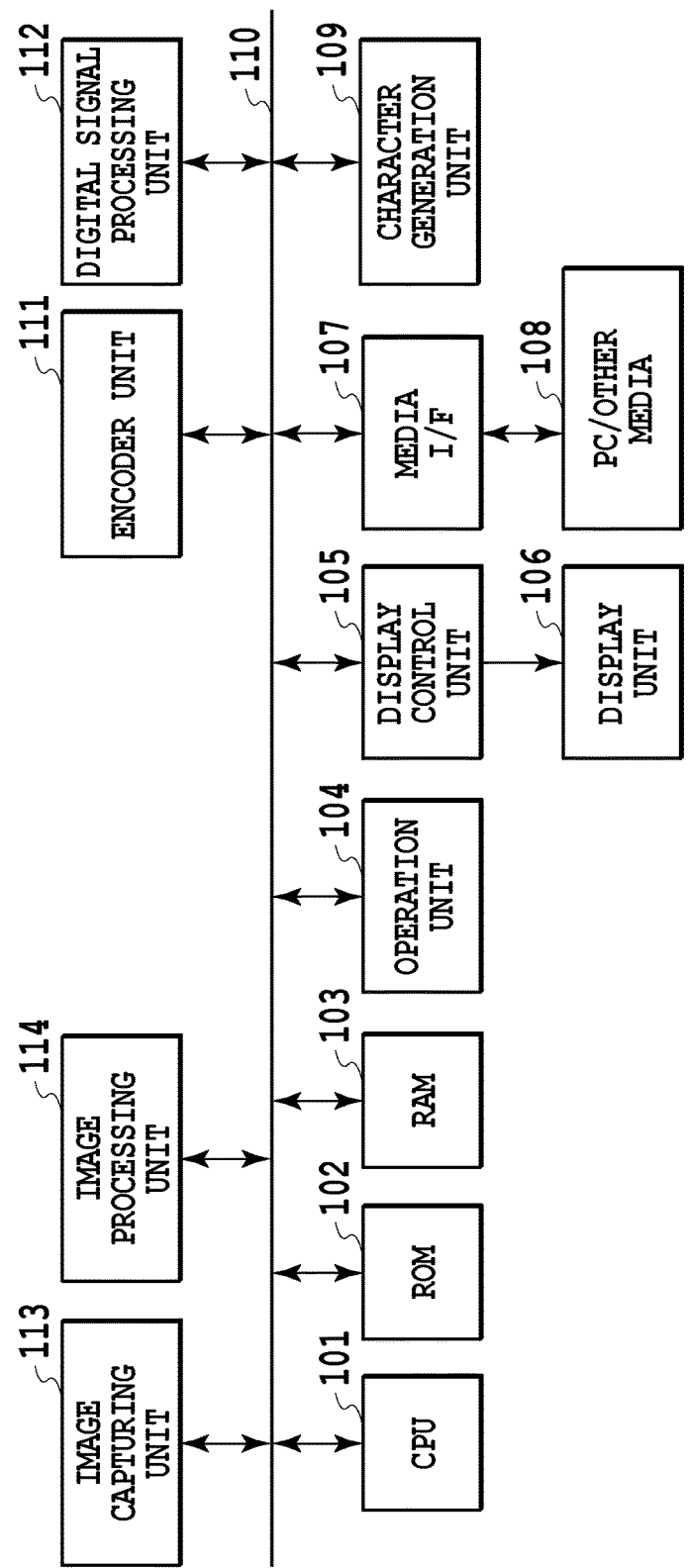
FIG. 1 is a block diagram showing a configuration example of an image capturing apparatus of a first embodiment.

FIG. 1 is a block diagram showing an example of a configuration of an image capturing apparatus according to a first embodiment of the present invention.

As shown in FIG. 1, the image capturing apparatus of the present embodiment includes a CPU 101, a ROM 102, a RAM 103, an operation unit 104, a display control unit 105, a media interface (hereinafter, media I/F) 107, and a character generation unit 109. Further, the image capturing apparatus of the present embodiment includes an encoder unit 111, a digital signal processing unit 112, an image capturing unit 113, and an image processing unit 114.

The image capturing unit 113 includes an optical system and an image capturing element and acquires light field data. Details of the image capturing unit 113 will be described later.

The image processing unit 114 generates a refocus image from the light field data acquired by the image capturing unit 113. Further, the image processing unit 114 also functions as an image processing apparatus installed inside or outside the image capturing apparatus. Details of the image processing unit 114 will be described later.

The CPU 101 sequentially reads commands stored in the ROM 102 and the RAM 103, interprets the commands, and performs processing in accordance with the results of the interpretation. Further, the ROM 102 and the RAM 103 provide programs, data, a work area, and so on, necessary for the processing to the CPU 101.

A bus 110 functions as a path to transmit and receive data and instructions of processing between each component.

To the operation unit 104, a button, a mode dial, and so on, correspond and the operation unit 104 receives user instructions input via the button, the mode dial, and so on.

The character generation unit 109 generates characters, graphics, and so on.

A display unit 106 is, for example, a liquid crystal display and displays captured image data and characters received from the character generation unit 109 and the display control unit 105. Further, the display unit 106 may have a touch screen function and in this case, it is also possible for the operation unit 104 to receive user instructions input via the display unit 106.

The digital signal processing unit 112 performs adjustment of the luminance value of the image data acquired by the image capturing unit 113 and interpolation of a defective pixel. This processing is performed before the processing by the image processing unit 114, to be described later.

The encoder unit 111 performs encode processing of the light field data generated as the results of the chromatic aberration correction processing by the image processing unit 114.

The media I/F 107 is an interface that connects PC/other media (e.g., hard disk, memory card, CF card, SD card, USB memory) 108 and the bus 110. Via the media I/F 107, the light field data encoded by the encoder unit 111 is output.

There exist components of the image capturing apparatus other than those described above, but they are not the main purpose of the present invention, and therefore, explanation is omitted.

<Configuration of Image Capturing Unit>

FIG. 2 shows a configuration example of the image capturing unit 113 according to the first embodiment of the present invention. In the following, the configuration example of the image capturing unit 113 is explained by using FIG. 2.

A lens 201 and a lens 202 make up an image forming optical system. The light ray emitted from a subject forms an image on a microlens 205 by the image forming optical system after passing through a diaphragm 203 and a shutter 204. Further, the light ray refracted by the microlens reaches an image capturing element 209 after passing through an IR cut filter 206, a low-pass filter 207, and a color filter 208. In the present embodiment, a color image is acquired by using three colors of RGB as a color filter.

The image capturing element 209 and an A/D conversion unit 210 correspond to an image sensor, such as a CMOS image sensor. The image capturing element 209 is arrayed in the form of a two-dimensional grid and converts an incident light ray into an electric signal. The A/D conversion unit 210 converts information on the light ray converted into an electric signal into a digital signal.

A control unit 212 controls the image capturing element 209 and the shutter 204 in accordance with instructions of the CPU 101 that are input via the bus 110 and performs image capturing. Further, the control unit 212 controls the lens 201 and the lens 202 and changes the focus position and the focal length into a state specified by a user. Furthermore, the control unit 212 controls the diaphragm 203 and changes the aperture into a state specified by a user.

The information on the image converted into the digital signal is stored within a buffer 211 and becomes light field data. The light field data is sent to the image processing unit 114 via the bus 110.

Figure 3A:
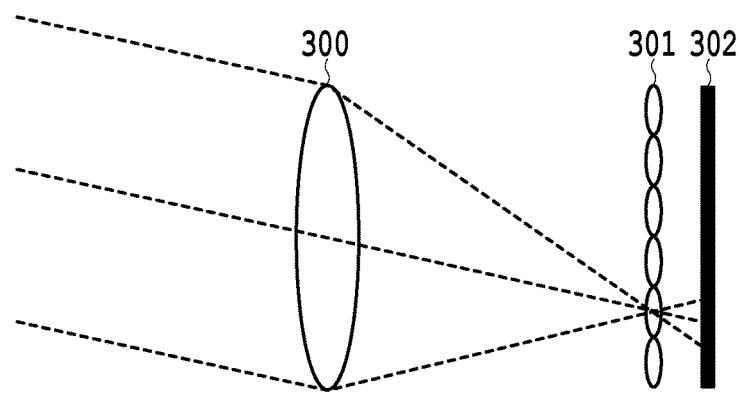
FIGS. 3A to 3C are each a schematic diagram showing an example of an optical system of the first embodiment.
Figure 3B:
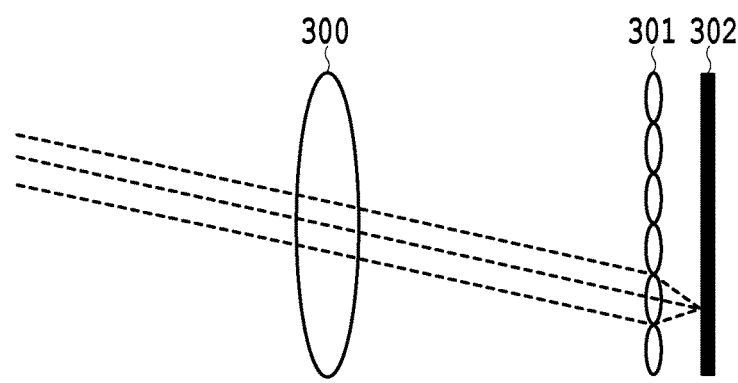
Figure 3C:
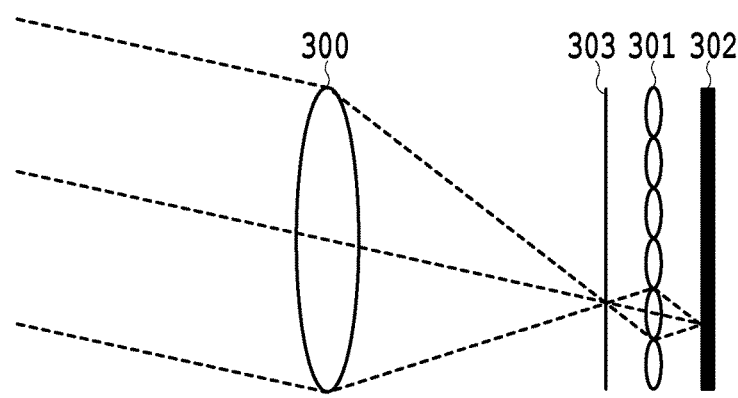

FIGS. 3A to 3C are each a schematic diagram showing an example of an optical system in the present embodiment. As shown in FIG. 3A, the optical system has, as a main lens 300, a thick convex lens made up of one or more lenses corresponding to the lens 201 and the lens 202 and has a microlens 301 on the focal point thereof. On the focal point of the microlens 301, as shown in FIG. 3B, an image capturing element 302 is installed. Light field data is obtained by the position of the microlens that is specified by the pixel position of the image capturing element 302 and through which the incident light ray has passed, and the angle of incidence to the microlens. The microlens 301 is installed on the focal point of the main lens 300 in the case where the focus of the main lens 300 is adjusted to the infinity and it may also be possible to change the relative position between the microlens 301 and the image capturing element 302, and the main lens 300 by focus adjustment.

The configuration of the image capturing unit shown here is an example of the configuration simplified for explanation and any configuration may be accepted as long as the configuration has a function to acquire the light field for the light of a plurality of wavelengths through an optical system having chromatic aberration. For example, as disclosed in Todor Georgiev, Andrew Lumsdaine, "Superresolution with Plenoptic Camera 2.0" (Adobe Technical Report), it may also be possible to perform refocus with a conjugate plane 303 for the microlens of the image capturing element as a center by using the arrangement of lenses as in FIG. 3C. In the present embodiment, the reference focus position is taken to be the installation position of the microlens, but in the case where this configuration is used, the conjugate plane 303 for the microlens will be the reference focus position.

<Representation Method of Light Field>

Next, the representation method of a light field in the present embodiment is explained. In the present embodiment, as shown in FIG. 4A, the optical axis of the optical system is taken to be the z-direction and the light ray that passes through a plate whose z-coordinate is a constant value is represented by four-dimensional coordinates using a position (x, y) of the passing point and a slope (u, v) of the light ray. The slope u represents the slope in the x-direction of the light ray and the slope v represents the slope in the y-direction of the light ray. FIG. 4B shows three light rays A, B, and C on the xz-plane in the real space. At this time, the slope u of the light ray is expressed by $\Delta x/\Delta z$. FIG. 4C shows the light rays A, B, and C on the xu-plane (z=0) in the light field space. The slope of the light ray A is the same as that of the light ray B, and therefore, the u-coordinate is the same. On the other hand, the passing position on the z=0 plane of the light ray B is the same as that of the light ray C, and therefore, the x-coordinate is the same.

Figure 5A:
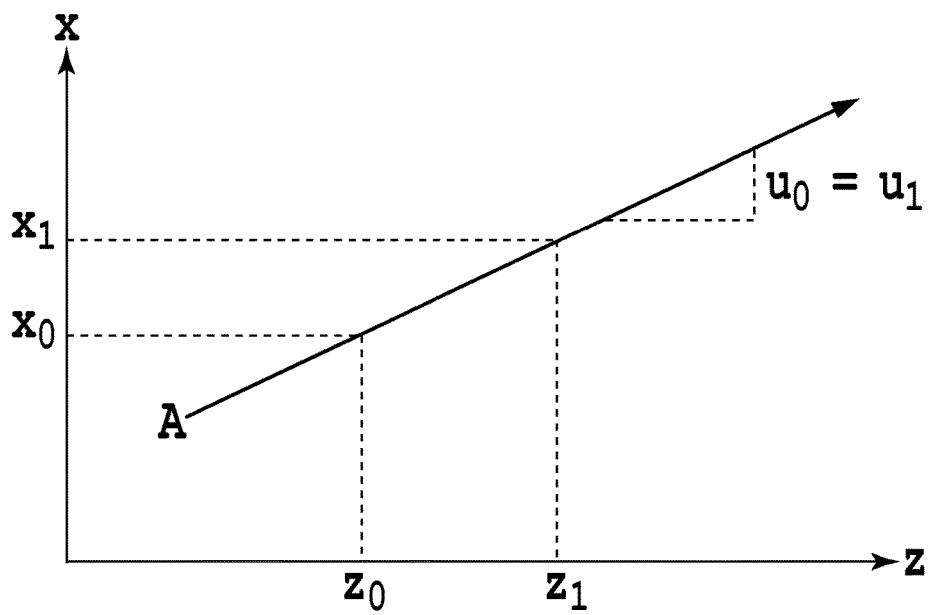
FIG. 5A and FIG. 5B are diagrams for explaining propagation of a light ray in a space and refraction by a lens.
Figure 5B:
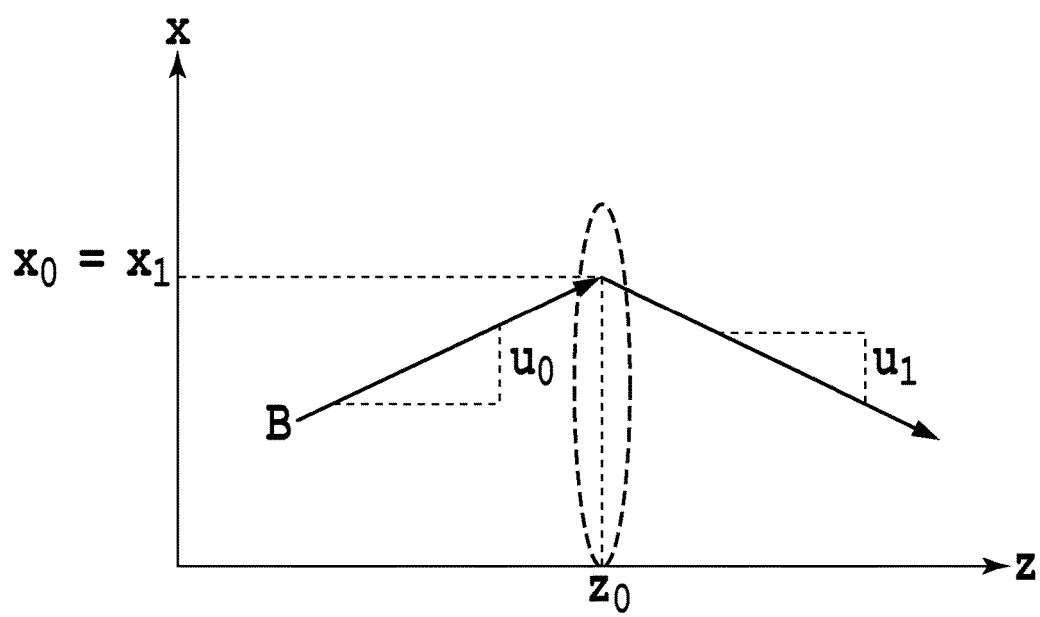

Next, how a light ray changes in the light field space by propagation in the space and refraction by a lens is explained. Here, as a matter of convenience, the light field is considered two-dimensionally by the position x and the slope u. FIG. 5A and FIG. 5B are diagrams for explaining propagation of a light ray in the space and refraction by a lens. FIG. 5A shows a light ray that propagates through the space on the xz-plane. Here, it is assumed that the light field coordinates of the light ray at $z=z_0$ are $(x_0, u_0)$ and the light field coordinates of the light ray at $z=z_1$ are $(x_1, u_1)$. The light ray travels straight, and therefore, the relationship between the light field coordinates at $z=z_0$ and $z=z_1$ will be as expression (1).

$$\begin{pmatrix} x_1 \\ u_1 \end{pmatrix} = \begin{pmatrix} 1 & z_1 - z_0 \\ 0 & 1 \end{pmatrix} \begin{pmatrix} x_0 \\ u_0 \end{pmatrix} \quad \text{expression (1)}$$

FIG. 5B shows the light ray that is refracted by a lens on the xz-plane. Here, it is assumed that the light field coordinates of the light ray before refraction at $z=z_0$ are $(x_0, u_0)$ and the light field coordinates of the light ray after refraction are $(x_1, u_1)$. In the case where the value of $x_0=x_1$ is close to the optical axis of the lens and the paraxial approximation holds, the relationship between the light field coordinates before and after refraction will be as expression (2) by using a focal length f from the nature of the optical system.

$$\begin{pmatrix} x_1 \\ u_1 \end{pmatrix} = \begin{pmatrix} 1 & 0 \\ -\frac{1}{f} & 1 \end{pmatrix} \begin{pmatrix} x_0 \\ u_0 \end{pmatrix} \quad \text{expression (2)}$$

The above relationship also holds for the position y and the slope v of the light ray.

<Example of Light Field of Light Ray that Propagates>

FIG. 6A and FIG. 6B each show an example of a light field of a light ray that propagates through an optical system. FIG. 6A shows the light ray on the xz-plane in the real space. The optical axis is situated on the straight line of x=0 and a lens is placed at the position of z=0. Light rays A, B, C, and D are emitted from the positions of z=−3 and x=±1. FIG. 6B shows the light rays on the xu-plane in the light field space. FIG. 6B shows the change of the light field coordinates of each light ray in the case where the light rays A, B, C, and D propagate from z=−3 to z=0 and reach z=3 after refraction. The light field coordinates of each light ray at z=−3 are (1, 1), (1, −1), (−1, 1), and (−1, −1), respectively. Each light ray reaches the positions of z=3 and x=±1 after being refracted by the lens. It is known that the propagation and refraction in the space are shearing on the light field coordinates as expressed by expression (1) and expression (3) described above, respectively.

Figure 7:
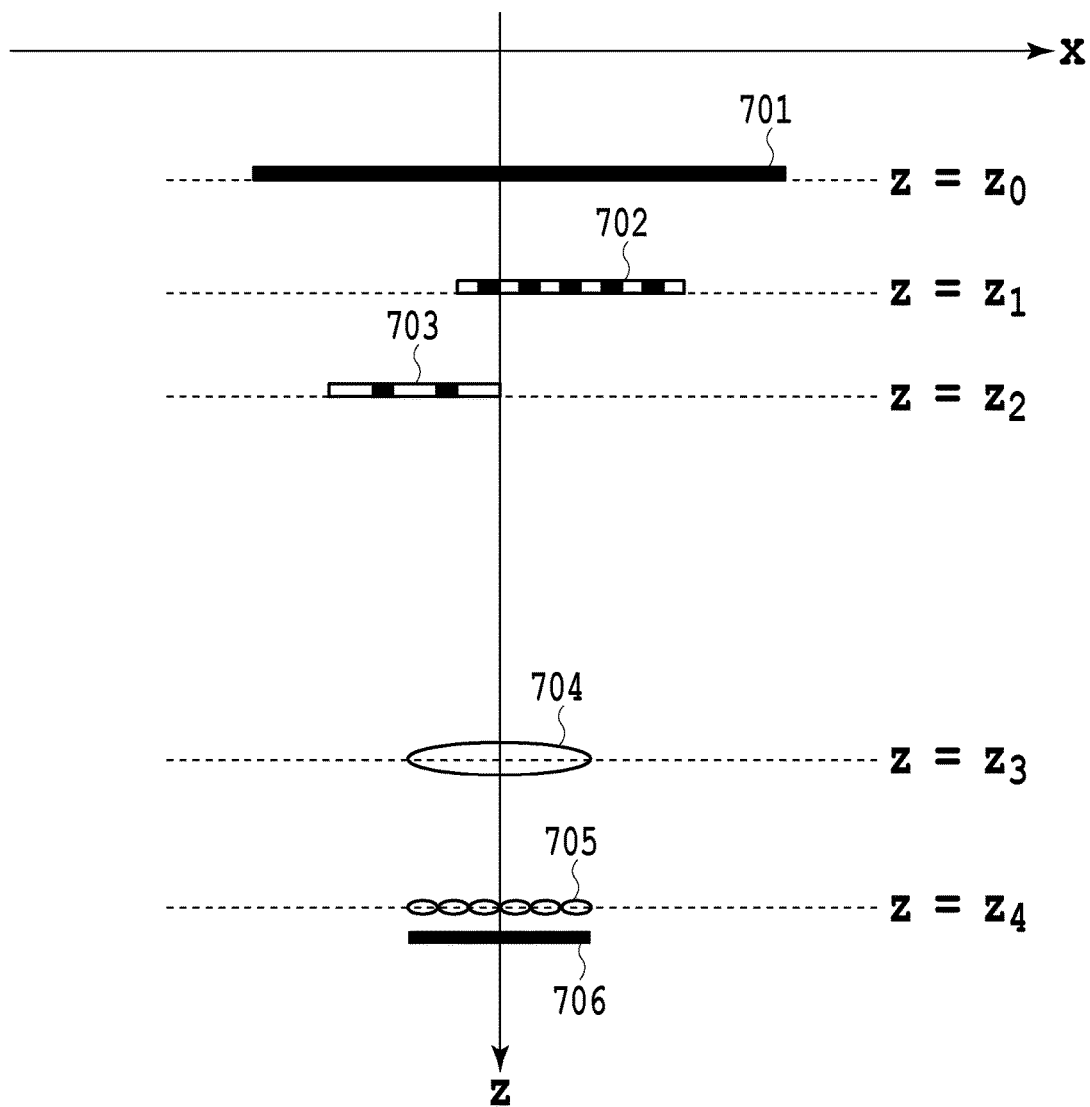
FIG. 7 is a diagram showing an example of a relationship between a subject and an optical system.

FIG. 7 shows an example of the relationship between a subject and an optical system. As shown schematically, the light rays emitted from subjects 701, 702, and 703 placed at $z=z_0$, $z_1$, and $z_2$ pass through a lens placed at $z=z_3$. Then, the light rays reach a microlens 705 placed at $z=z_4$ and recorded by an image capturing element 706 as light field data.

Figure 8:
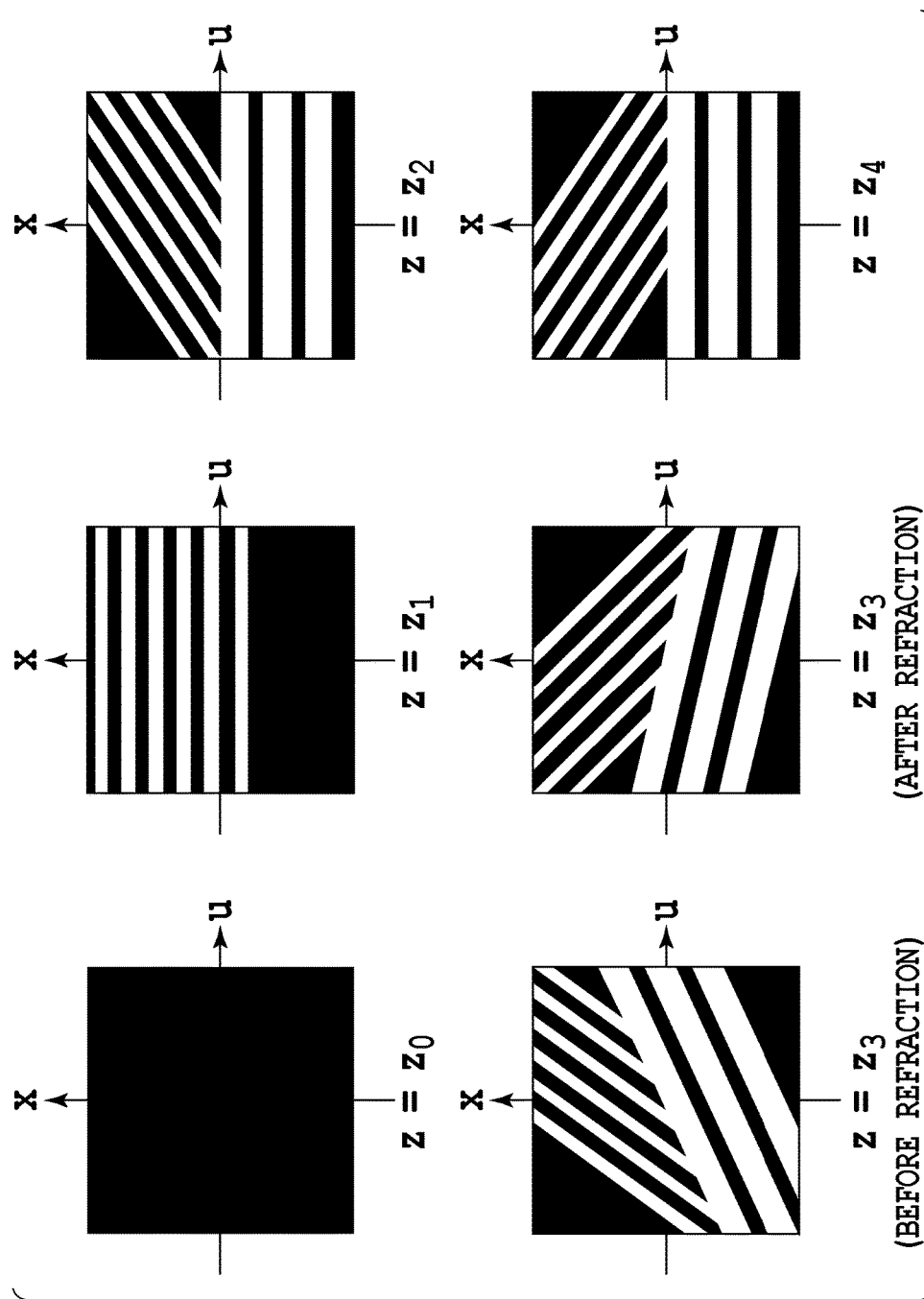
FIG. 8 is a diagram schematically showing the way a light field changes in accordance with propagation of a light ray.

FIG. 8 is a diagram schematically showing the way the light field changes as the light ray propagates in the example shown in FIG. 7. The top-left, top-center, top-right, bottom-left, and bottom-center diagrams in FIG. 8 each show the light field in the case where recording is possible at the positions of $z=z_0$ to $z_3$, respectively.

First, at $z=z_0$, the color of the subject 701 is reflected and the entire surface of the light field is black. At $z=z_1$, the light ray emitted from the subject 702 is added to the light field. At this time, the portion of the light ray emitted from the subject 701, which overlaps the subject 702, is shut off by occlusion. At $z=z_2$, the light field by the light rays emitted from the subjects 701 and 702 undergoes shearing conversion as expression (1) by propagation and the light field of the light ray emitted from the subject 703 overlaps thereon. At $z=z_3$, the light field of the light rays emitted from all the subjects further undergoes shearing conversion by propagation. In the case where refraction takes place at $z=z_3$, the light field undergoes shearing conversion as expression (2). By the propagation up to $z=z_4$, the light field undergoes again shearing conversion as expression (1) and as a result of this, the light field as shown in the bottom-right diagram in FIG. 8 is recorded by the microlens 705 and the image capturing element 705. In the bottom-right diagram in FIG. 8, the light field recorded in the state where $z=z_2$ is brought into focus is shown.

<Chromatic Aberration in Light Field>

In the case where an optical system is made up of material having wavelength dispersion, such as glass, the characteristics of the optical system change depending on the wavelength of light, i.e., the color. Due to this phenomenon, as shown in FIG. 9, the focal length and the position of the principal plane change for each wavelength. FIG. 9 is a diagram for explaining chromatic aberration for a light ray. In FIG. 9, a light ray L that is emitted from a subject and which propagates the space separates into a green light ray $L_G$ and a blue light ray $L_B$ shifted from each other as a result of refraction by an optical system 902 having wavelength dispersion. Here, a plane 903 is the principal plane on the object side (hereinafter, object-side principal plane) for the wavelength of the light ray $L_B$ and a plane 904 is the object-side principal plane for the wavelength of the light ray $L_G$. Further, a plane 905 is the principal plane on the image side (hereinafter, image-side principal plane) for the wavelength of the light ray $L_B$ and a plane 906 is the image-side principal plane for the wavelength of the light ray $L_G$. As in the case of the shift between the light ray $L_G$ and the light ray $L_B$, the positions at which an image is formed being shifted due to the wavelength dispersion of the optical system is called chromatic aberration.

Figure 10B:
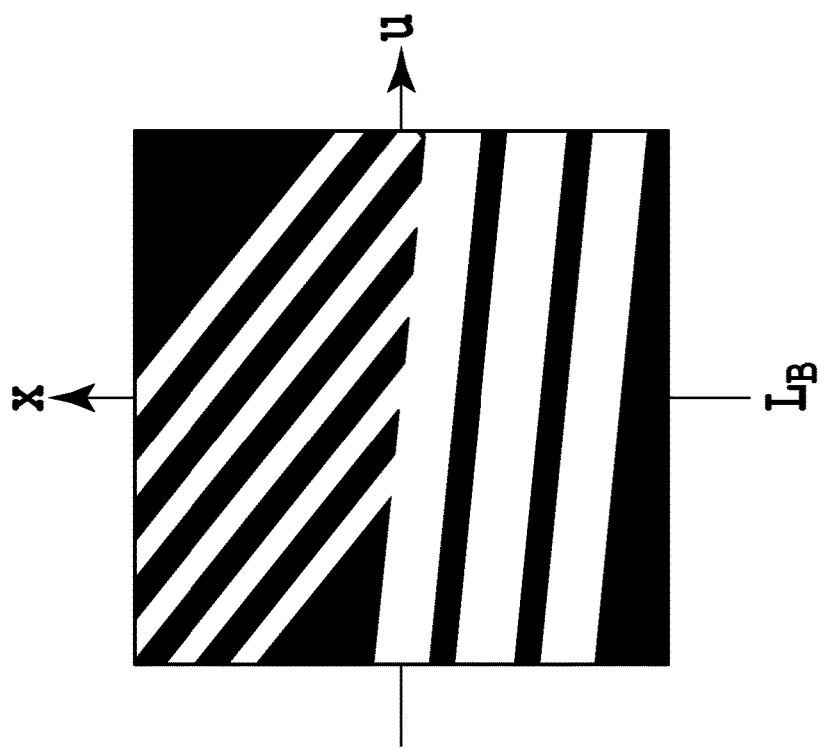
FIG. 10A and FIG. 10B are diagrams for explaining chromatic aberration in a light field.
Figure 10A:
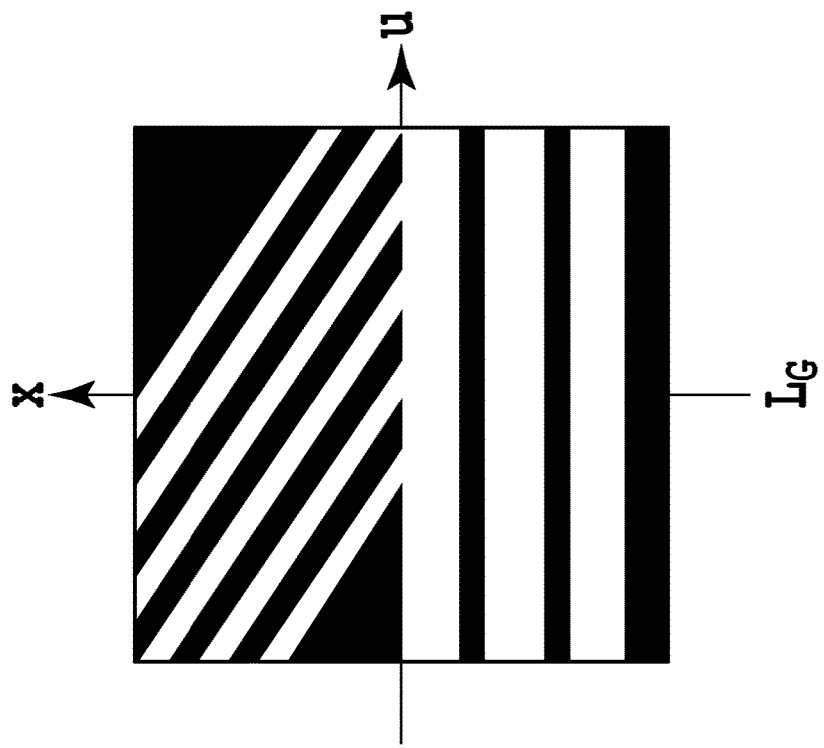

FIG. 10A and FIG. 10B are diagrams for explaining chromatic aberration in the light field. In FIG. 10A, the light field data of the light ray $L_G$ that is recorded by a microlens 907 and an image capturing element 908 is shown. In FIG. 10B, the light field data of the light ray $L_B$ that is recorded by the microlens 907 and the image capturing element 908 is shown. As shown in FIG. 10A and FIG. 10B, the light ray $L_G$ and the light ray $L_B$ are shifted from each other. The image capturing apparatus in the present embodiment corrects the light field data so as to eliminate the chromatic aberration by the shift such as this. For example, the image capturing apparatus in the present embodiment performs conversion of at least one piece of the light field data so that the light ray $L_G$ and the light ray $L_B$ overlap. The conversion to cause the light ray $L_B$ to overlap the light ray $L_G$ is equivalent to the light field data acquired by the image capturing element 908 being returned to the plane 903 with the characteristics for the wavelength of the light ray $L_B$ and being propagated again to the microlens 907 with the characteristics for the wavelength of the light ray $L_G$. Such conversion is a combination of the conversion by expression (1) and expression (2) described above and inverse conversion thereof as long as the paraxial approximation holds. Consequently, in the case where the position of a point on the light field data of the wavelength of the light ray $L_G$ is taken to be $(x_G, u_G)$ and the position of a point on the light field data of the wavelength of the light ray $L_B$ is taken to be $(x_B, u_B)$, it is possible to express the relationship therebetween by linear conversion as expression (3) below.

$$\begin{pmatrix} x_G \\ u_G \end{pmatrix} = \begin{pmatrix} a & b \\ c & d \end{pmatrix} \begin{pmatrix} x_B \\ u_B \end{pmatrix} \quad \text{expression (3)}$$

Further, the same relationship holds also for the position y and the slope v of the light ray in the direction vertical to (x, u). Because of this, in the case where the position of a point on the light field data of the wavelength of the light ray $L_G$ is taken to be $(y_G, v_G)$ and the position of a point on the light field data of the wavelength of the light ray $L_B$ is taken to be $(y_B, v_B)$, expression (4) below holds similarly.

$$\begin{pmatrix} y_G \\ v_G \end{pmatrix} = \begin{pmatrix} a & b \\ c & d \end{pmatrix} \begin{pmatrix} y_B \\ v_B \end{pmatrix} \quad \text{expression (4)}$$

In the present embodiment, chromatic aberration is corrected by resampling the light field data based on the correspondence relationship between the light fields of different wavelengths as expression (3) and expression (4), which is found in advance from the design values and measurement results.

It is possible to calculate parameters a, b, c, and d that describe the correspondence between the light fields based on the design values and measured values by combining expression (1) and expression (2). As an example, in the case where the focal lengths in the respective wavelengths of the light ray $L_G$ and the light ray $L_B$ are taken to be $f_G$ and $f_B$, the principal point positions on the object side to be $p_G$ and $p_B$, the principal point positions on the image side to be $p'_G$ and $p'_B$, and the microlens installation position to be s, it is possible to express the parameters a, b, c, and d as expression (5) below.

$$\begin{pmatrix} a & b \\ c & d \end{pmatrix} = \begin{pmatrix} 1 & s - p'_G \\ 0 & 1 \end{pmatrix} \begin{pmatrix} 1 & 0 \\ -\frac{1}{f_G} & 1 \end{pmatrix} \begin{pmatrix} 1 & p_G \\ 0 & 1 \end{pmatrix}$$

$$\begin{pmatrix} 1 & p_B \\ 0 & 1 \end{pmatrix}^{-1} \begin{pmatrix} 1 & 0 \\ -\frac{1}{f_B} & 1 \end{pmatrix}^{-1} \begin{pmatrix} 1 & s - p'_B \\ 0 & 1 \end{pmatrix}^{-1} \quad \text{expression (5)}$$

<Change of Integration Range at the Time of Sampling by Correction of Chromatic Aberration>

Figure 11:
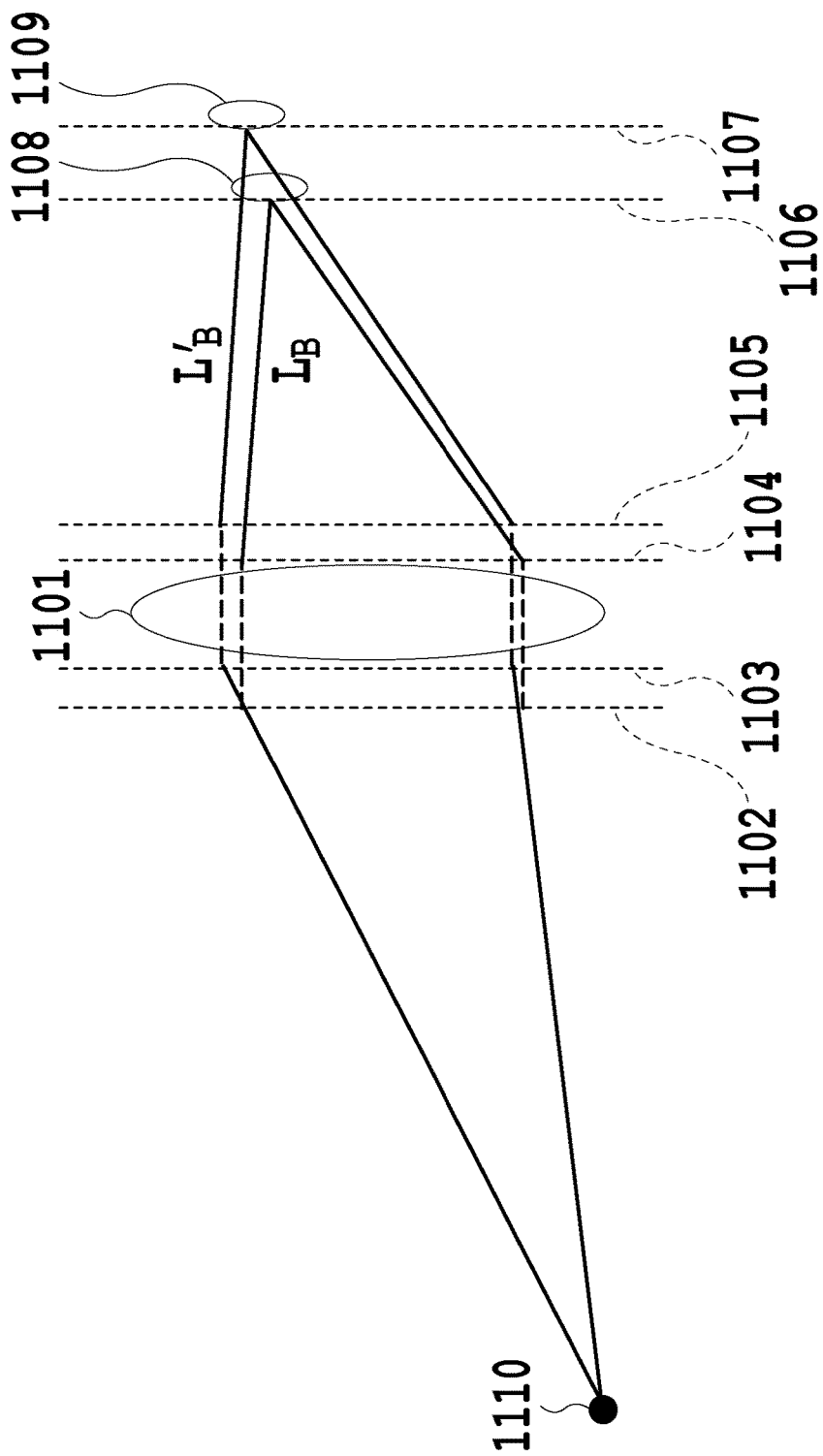
FIG. 11 is a diagram showing a change of an integration range in the real space due to chromatic aberration correction.

The light field data is acquired by integrating and sampling the light ray having passed through the optical system as shown in FIGS. 3A to 3C by an image capturing element having a finite aperture. In the case where the chromatic aberration correction is performed, the integration range in the space after the correction reflects the difference in the optical characteristics for each wavelength, and therefore, differs from one another. FIG. 11 is a diagram showing a change of the integration range in the real space by the chromatic aberration correction. Here, the light ray $L_B$ represents the blue light ray that is sampled through a microlens 1108 and corresponds to a conjugate point on the object side through a main lens 1101. The object-side principal plane of the main lens for the blue light ray $L_B$ is 1102 and the image-side principal plane of that is 1104, and the object-side principal plane for the green light ray $L_G$ is 1103 and the image-side principal plane of that is 1105. A light ray that is obtained by performing the chromatic aberration correction of the light ray $L_B$ in accordance with the optical characteristics of the main lens for the light ray $L_G$ is $L'_B$. The light ray $L_B$ having been corresponding to the light ray that passes through the microlens 1108 is converted into a light ray that passes through a virtual microlens 1109 in the space after the correction. That is, a plane on which the microlens is placed moves to a plane 1107 by the chromatic aberration correction.

FIGS. 12A and 12B show a change of the integration range in the light field space by the chromatic aberration correction. FIGS. 12A and 12B each show the light field space on the microlens installation plane 1106. FIG. 12A shows the integration range of the light rays $L_B$ and $L_G$ before the correction and FIG. 12B shows the integration range of the light ray $L'_B$ after the correction. The light ray $L'_B$ is a light ray that is sampled by the virtual microlens installation plane 107 and undergoes shearing conversion by moving through the space up to the actual microlens installation plane 1106.

<Difference in Sharpness for Each Wavelength Caused by Chromatic Aberration>

A refocus image is generated by integrating the light field data at the position of the image capturing element, at which it is desired to virtually reproduce the light field data, in the u-direction in the light field space. Here, it is considered to generate a refocus image in the case where the image capturing element is placed on the actual microlens installation plane 1106. At this time, the integration range of the light filed of the light ray $L_G$ is as in FIG. 12A and the integration range of the light filed of the light ray $L'_B$ is as in FIG. 12B. Each of the integration ranges has a spread different in the x-direction and in the case where it is assumed that the light ray is emitted isotropically, it is possible to regard that different filters in the x-direction are applied to the light ray $L_G$ and the light ray $L'_B$, respectively, in correspondence to the spread in the x-direction of the integration range.

Figure 13B:
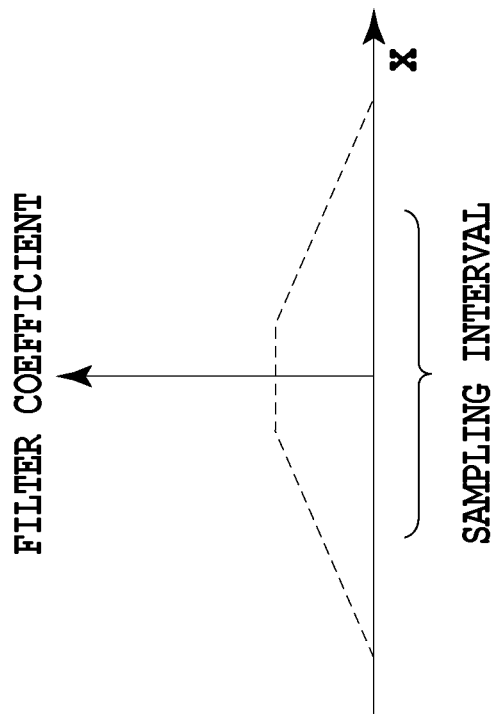
FIG. 13A and FIG. 13B are diagrams showing an outline of a filter corresponding to blurring caused by transformation of light field data.
Figure 13A:
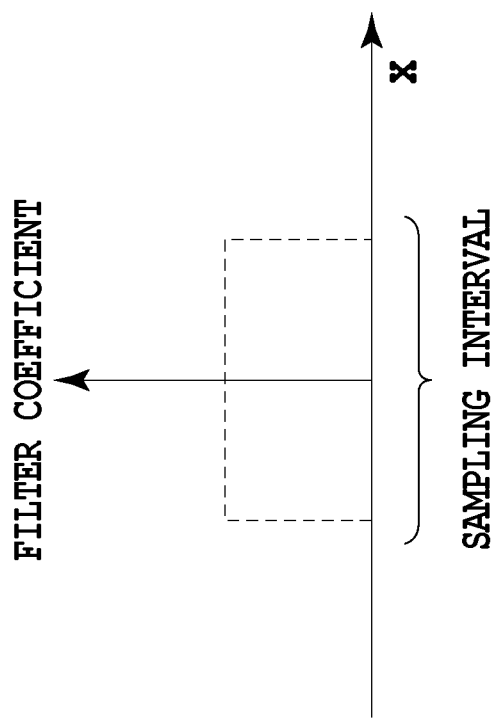

FIGS. 13A and 13B are each a diagram showing an outline of a filter corresponding to blurring caused by a change in light field data. FIG. 13A shows a filter for the light ray $L_G$ and FIG. 13B shows a filter for the light ray $L'_B$. In this example, a refocus image with a higher degree of sharpness is obtained from the light ray $L_G$ than the light ray $L'_B$.

Figure 14A:
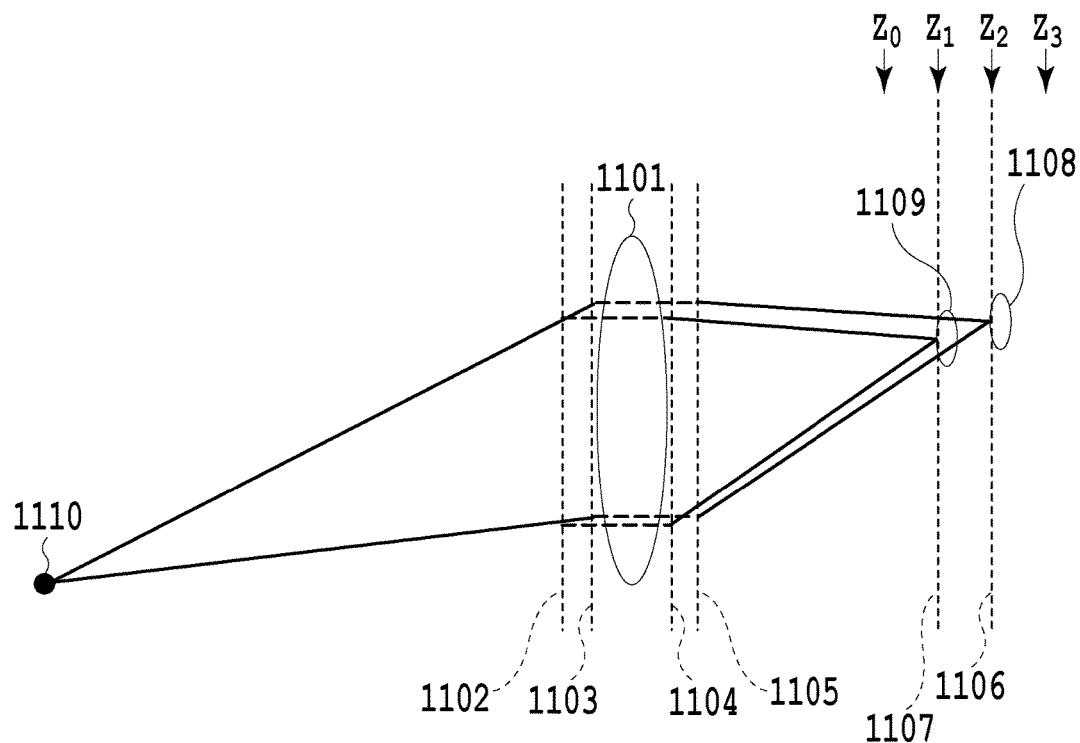
FIG. 14A and FIG. 14B are schematic diagrams showing a change in sharpness for each channel in the case where a refocus position changes.
Figure 14B:
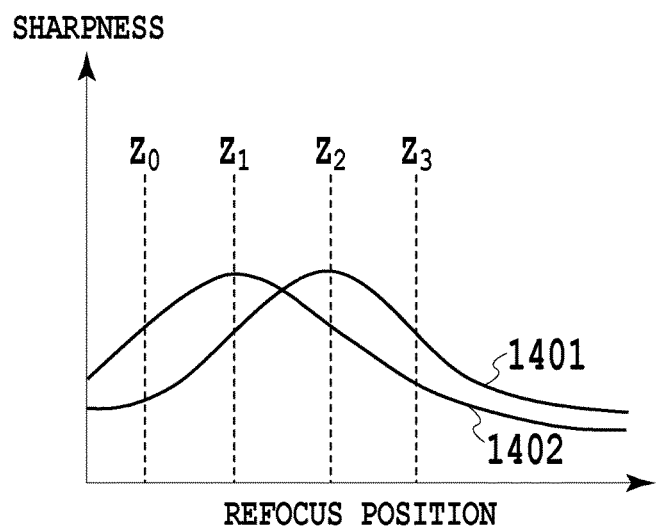

FIGS. 14A and 14B are schematic diagrams showing a change in sharpness for each channel in the case where the position (refocus position) at which a virtual image capturing element is placed in the refocus processing. For each of the refocus positions of $z=z_0, z_1, z_2$, and $z_3$, sharpness 1402 of the green channel and sharpness 1401 of the blue channel of the refocus image change as shown schematically.

As explained above, the image capturing apparatus in the present embodiment corrects a color blur caused by a difference in sharpness between channels of a refocus image.

<Configuration and Processing in Image Processing Unit>

Figure 15:
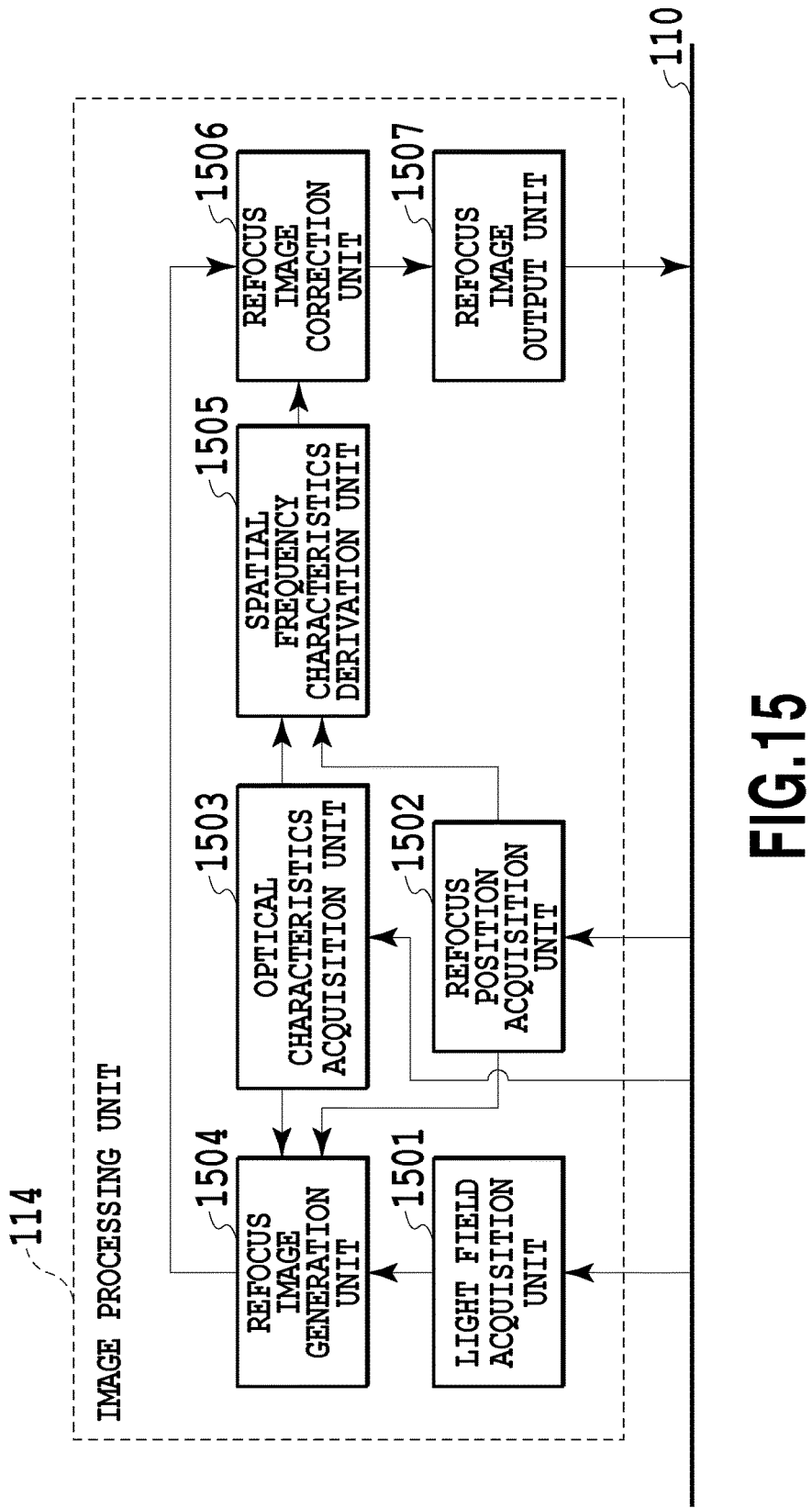
FIG. 15 is a block diagram showing a configuration example of an image processing unit of the first embodiment.

FIG. 15 is a block diagram showing a configuration example of the image processing unit 114 of the image capturing apparatus in the present embodiment. The image processing unit 114 includes a light field acquisition unit 1501, a refocus position acquisition unit 1502, an optical characteristics acquisition unit 1503, and a refocus image generation unit 1504. Further, the image processing unit 114 includes a spatial frequency characteristics derivation unit 1505, a refocus image correction unit 1506, and a refocus image output unit 1507.

The light field acquisition unit 1501 acquires light field data including channels of a plurality of light rays of different wavelengths via the bus 110. Here, it is assumed that the light field data has been converted in advance in accordance with the light field coordinates on the microlens 205 based on the design information and configuration information. Further, in the present embodiment, as an example, it is also assumed that the light field data is made up of three channels of three wavelengths, i.e., red, blue, and green.

The refocus position acquisition unit 1502 acquires the position at which a virtual image capturing element is placed in the refocus processing as a refocus position via the bus 110. In the present embodiment, it is assumed that the refocus position is represented as an amount of movement relative to the reference position.

The optical characteristics acquisition unit 1503 acquires the optical characteristics for each channel of the optical system via the bus 110. Here, the optical characteristics may be any optical characteristics as long as they have information sufficient for generation of a refocus image in which a deviation in the light field data of each channel due to chromatic aberration is corrected and derivation of sharpness due to a difference in the integration range after the correction between channels. It is assumed that the optical characteristics in the present embodiment are represented by parameters describing a relationship as expression (3) or expression (4), which associates the coordinates of the light field data of the green channel and the coordinates of the light field data of another channel with each other.

The refocus image generation unit 1504 generates a refocus image for each channel at the refocus position acquired by the refocus position acquisition unit 1502. The refocus image is generated based on the light field data acquired by the light field acquisition unit 1501 and the optical characteristics acquired by the optical characteristics acquisition unit 1503. Details will be described later.

The spatial frequency characteristics derivation unit 1505 derives spatial frequency characteristics representing sharpness of each channel, which results from a change of the integration range of each light ray in the light field data due to the chromatic aberration correction. The spatial frequency characteristics are derived from the optical characteristics of the target channel acquired by the optical characteristics acquisition unit 1503 and the refocus position acquired by the refocus position acquisition unit 1502. Details will be described later.

The refocus image correction unit 1506 performs color blur correction for the refocus image of each channel generated by the refocus image generation unit 1504 based on the spatial frequency characteristics of each channel derived by the spatial frequency characteristics derivation unit 1505. Details will be described later.

The refocus image output unit 1507 outputs the refocus image corrected by the refocus image correction unit 1506.

Figure 16:
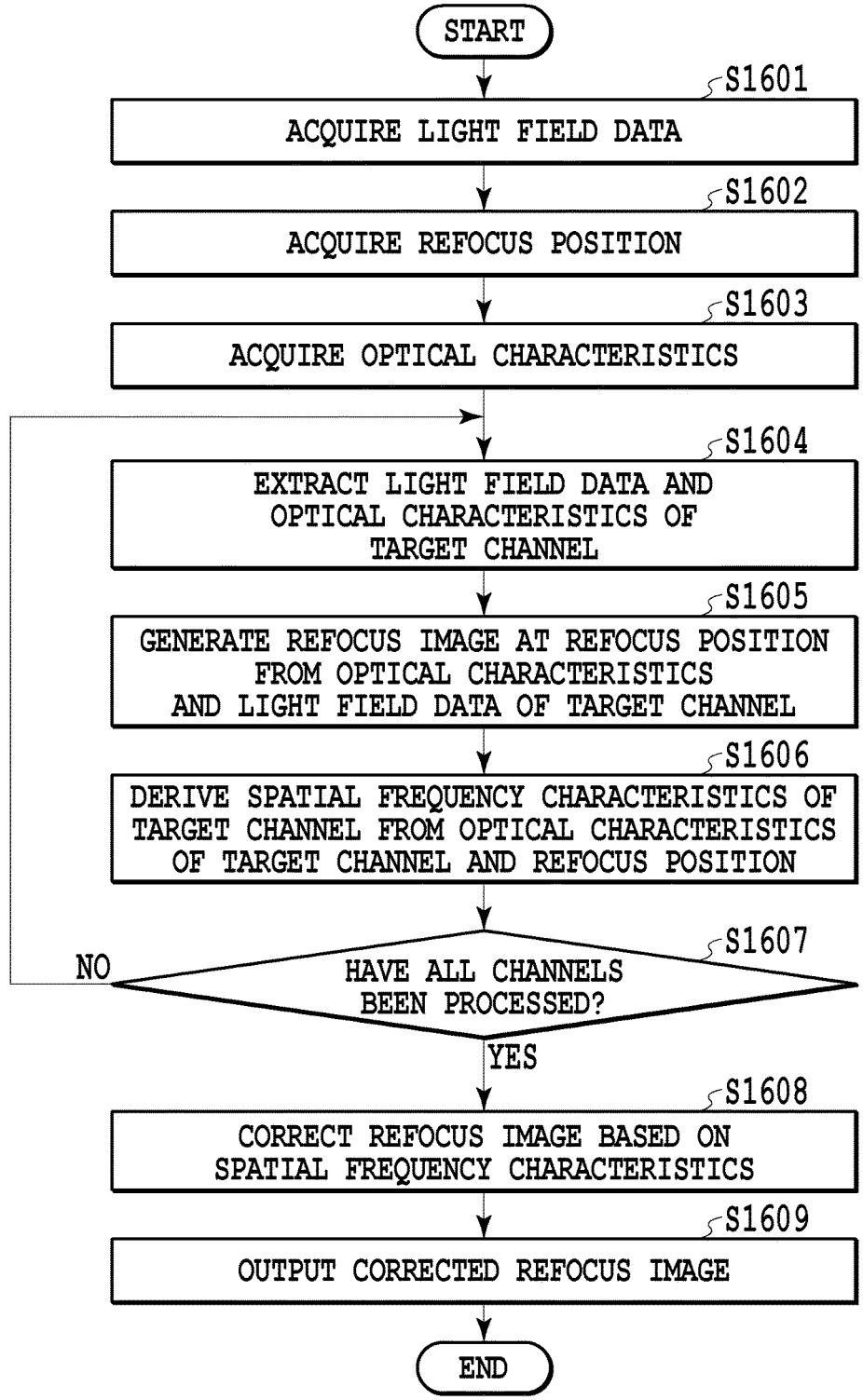
FIG. 16 is a diagram showing an example of a processing flow of image processing performed by the image processing unit of the first embodiment.

Next, by using FIG. 16, an example of the processing flow of the image processing performed by the image processing unit 114 of the present embodiment is explained.

At step S1601, the light field acquisition unit 1501 acquires light field data including a plurality of channels whose wavelengths are different.

At step S1602, the refocus position acquisition unit 1502 acquires a refocus position.

At step S1603, the optical characteristics acquisition unit 1503 acquires optical characteristics for each channel of the optical system.

The processing at step S1604 to step S1607 is processing for each channel and is repeated until the processing for all the channels is completed. Determination of termination is performed at step S1607.

At step S1604, the refocus image generation unit 1504 and the spatial frequency characteristics derivation unit 1505 extract light field data and optical characteristics of a new target channel from the acquired light field data and optical characteristics.

At step S1605, the refocus image generation unit 1504 generates a refocus image at the refocus position acquired at step S1602 from the light field data and the optical characteristics of the target channel extracted at step S1604. Details will be described later.

At step S1606, the spatial frequency characteristics derivation unit 1505 derives spatial frequency characteristics of the target channel from the optical characteristics of the target channel extracted at step S1604 and the refocus position acquired at step S1602. Details will be described later.

In the case where generation of the refocus image and derivation of the spatial frequency characteristics are completed for all the channels, the processing advances to step S1608.

At step S1608, the refocus image correction unit 1506 performs color blur correction for the refocus image generated at step S1605 based on the spatial frequency characteristics derived at step S1606. Details will be described later.

At step S1609, the refocus image output unit 1507 outputs the refocus image corrected at step S1608.

<Configuration and Processing of Refocus Image Generation Unit>

Next, the refocus image generation processing performed by the refocus image generation unit 1504 at step S1605 described above is explained in more detail.

Figure 17:
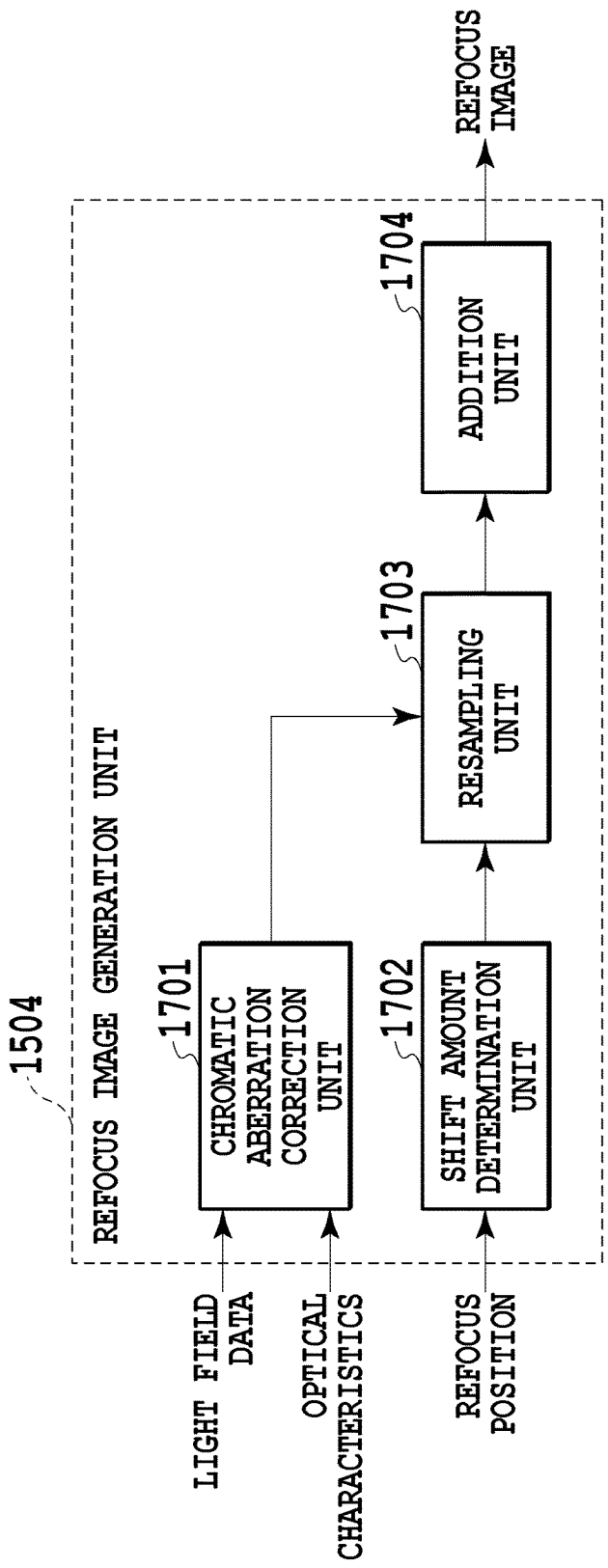
FIG. 17 is a block diagram showing a configuration example of a refocus image generation unit of the first embodiment.

FIG. 17 is a block diagram showing a configuration example of the refocus image generation unit 1504 in the present embodiment. The refocus image generation unit 1504 includes a chromatic aberration correction unit 1701, a shift amount determination unit 1702, a resampling unit 1703, and an addition unit 1704.

The chromatic aberration correction unit 1701 performs chromatic aberration correction of light field data by performing resampling based on the correspondence, which is input as optical characteristics, of the light field between different channels as expressed by expression (3) and expression (4). In the present embodiment, the light field data is transformed so that the light field data of the blue channel and the light field data of the red channel overlap by taking the light field on the microlens installation plane of the green channel to be a reference. For example, it is assumed that the focal lengths in the green and blue wavelengths are 50 mm and 52 mm, the object-side principal point positions are 0 mm and 5 mm, the image-side principal point positions are 13 mm and 15 mm, and the microlens installation position is 75 mm. In this case, by expression (5), conversion parameters from the light field coordinates of the green channel into the light field coordinates of the blue channel are (a, b, c, d)=(1.0285, −0.6692, −0.0012, 0.9731). Those conversion parameters are notation to which physical significance is given and in the case where the light field data is handled as 4D discretely sampled data having a value at a position of integer coordinates, conversion between normalized coordinates and physical coordinates is necessary. In the case where it is assumed that a microlens interval $\Delta m$ is 0.1 mm, a pupil division width $\Delta a$ is 0.1 (notation by the slope of light ray), a pupil division number n is 5, and a position c at which the plane of the image capturing element and the optical axis intersect 10 mm distant in the vertical direction and 10 mm distant in the horizontal direction, respectively, from the end portion of the image capturing element, it is possible to perform conversion by expression (6) below.

$$\begin{pmatrix} x \\ y \\ u \\ v \end{pmatrix} = \begin{pmatrix} x'\Delta m - c \\ y'\Delta m - c \\ u'\Delta a - (n-1)\Delta a/2 \\ v'\Delta a - (n-1)\Delta a/2 \end{pmatrix} = \begin{pmatrix} 0.1x' - 10 \\ 0.1y' - 10 \\ 0.1u' - 0.2 \\ 0.1v' - 0.2 \end{pmatrix} \quad \text{expression (6)}$$

At this time, x, y, u, and v represent the physical coordinates and x', y', u', and v' represent the normalized coordinates. As above, by calculating the correspondence of the light field coordinates between channels and performing resampling by using bilinear interpolation and the like for (x, u) and (y, v), respectively, it is possible to perform the chromatic aberration correction of the light field data.

The shift amount determination unit 1702 determines transformation of the light field data in the case where the light ray is caused to propagate from the reference microlens installation plane to the refocus position based on the relationship expressed by expression (1). In the present embodiment, it is assumed that the data sampled in the form of a grid on the light field space represented by (x, u) and (y, v) is input to the refocus image generation unit 1504. Consequently, transformation of the light field data by propagation of light ray is equivalent to shifting a light ray passing position (x, y) by a shift amount determined for each light ray direction (u, v). The shift amount determination unit 1702 determines this shift amount as information representing transformation of light field data. In the case where the position of the microlens is taken to be $z_0$ and the refocus position to be $z_1$, a shift amount ($\Delta x$, $\Delta y$) is determined as expression (7) below for the light ray direction (u, v).

$$\begin{pmatrix} \Delta x \\ \Delta y \end{pmatrix} = (z_1 - z_0) \begin{pmatrix} u \\ v \end{pmatrix} \quad \text{expression (7)}$$

For example, in the case where refocus is performed at the position moved 2 mm from the reference installation position of the microlens in the image-side direction for the light field having a light ray direction of (u, v)=(0.1, −0.2), the shift amount is ($\Delta x$, $\Delta y$)=(0.2 mm, −0.4 mm).

The resampling unit 1703 resamples the light field data for which the chromatic aberration correction unit 1701 has performed chromatic aberration correction by shifting the light field data for each light ray direction (u, v) based on the shift amount determined by the shift amount determination unit 1702. It is possible to perform resampling by using bilinear interpolation and the like by regarding the light field data on the xy-plane in each light ray direction (u, v) as normal image data.

The addition unit 1704 generates a refocus image by adding the light field data resampled by the resampling unit 1703 and the light field data in all the light ray directions (u, v) for each light ray passing position (x, y). The scale of the pixel value is adjusted in accordance with the necessity.

Figure 18:
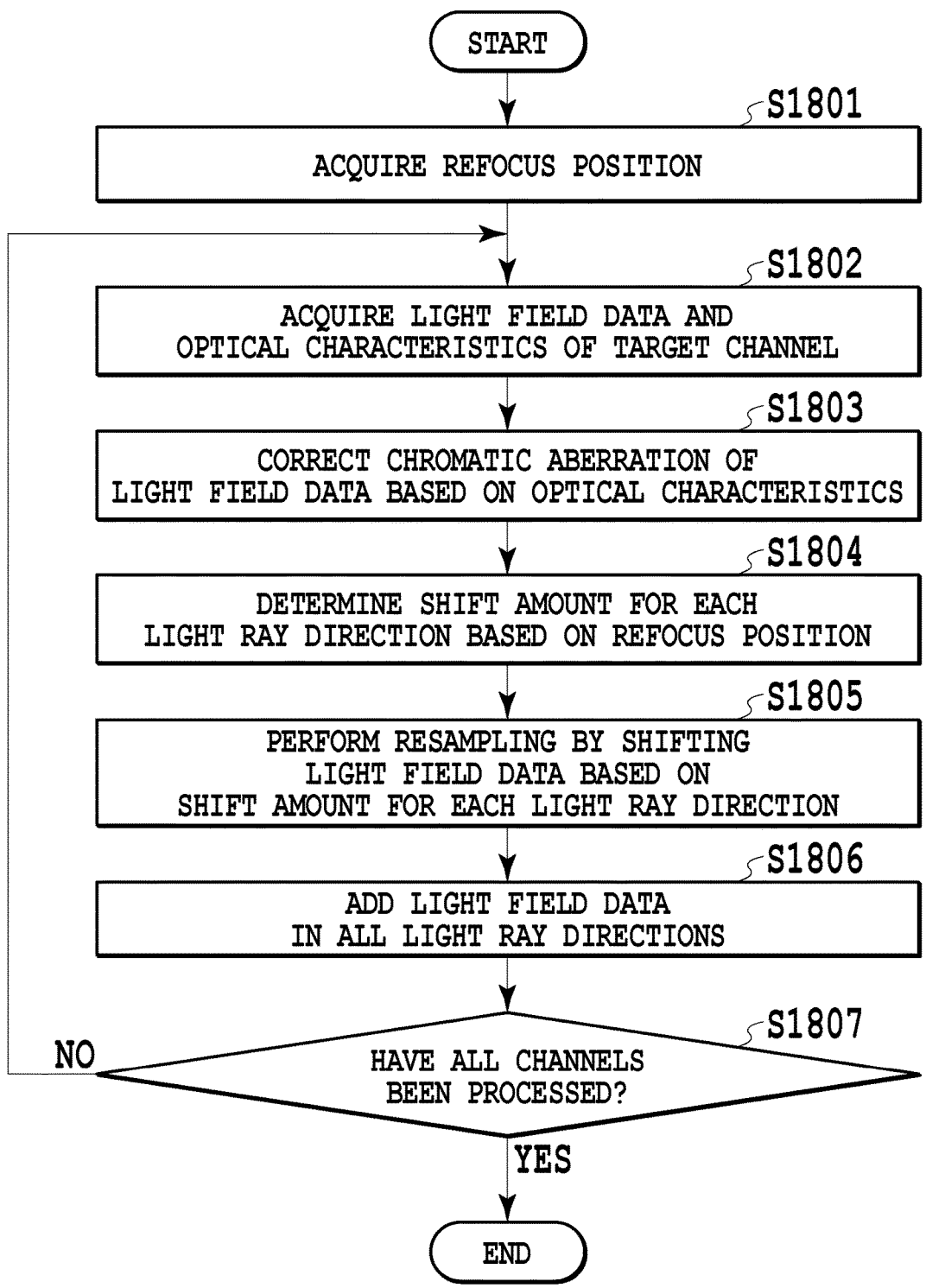
FIG. 18 is a diagram showing an example of a processing flow of refocus image generation processing of the first embodiment.

Next, by using FIG. 18, an example of the processing flow of the refocus image generation processing in the present embodiment is explained.

At step S1801, the shift amount determination unit 1702 acquires a refocus position.

The processing at step S1802 to step S1807 is processing for each channel. At step S1807, whether all the channels have been processed is determined and in the case where all the channels have not been processed, the processing returns to step S1802 and the processing is repeated, and in the case where all the channels have been processed, the processing is terminated.

At step S1802, the chromatic aberration correction unit 1701 acquires optical characteristics and light field data of a new target channel.

At step S1803, the chromatic aberration correction unit 1701 performs chromatic aberration correction for the light field data acquired at step S1802 based on the optical characteristics acquired step S1802.

At step S1804, the shift amount determination unit 1702 determines a shift amount of the light field data for each light ray direction by refocus based on the refocus position acquired at step S1801.

At step S1805, the resampling unit 1703 resamples the light field data to which the chromatic aberration correction has been applied at step S1803 by shifting the light field data based on the shift amount determined at step S1804.

At step S1806, the addition unit 1704 generates a refocus image by adding the light field data resampled by the resampling unit 1703 in all the light ray directions.

<Configuration and Processing of Spatial Frequency Characteristics Derivation Unit>

Next, the spatial frequency characteristics derivation processing performed by the spatial frequency characteristics derivation unit 1505 at step S1606 described above is explained in more detail.

The spatial frequency characteristics derivation unit 1505 derives an integration range at the time of refocus by applying transformation of the light field by chromatic aberration correction and the shift for each light ray direction to the integration range in the light field space corresponding to the spread of the pixel aperture. Further, the spatial frequency characteristics derivation unit 1505 derives the coefficient of a filter representing the spatial frequency characteristics by performing integration in all the light ray directions (u, v) for each light ray passing position (x, y) based on the assumption that the intensity of the light ray emitted from a subject is uniform irrespective of the light ray direction. Here, the correspondence between the spread of the pixel aperture and the integration range is derived based on optical characteristics. In the present embodiment, it is assumed that the correspondence is derived based on the focal length and the focus distance of each microlens and the installation position and the spread of the aperture of the image capturing element.

Figure 19:
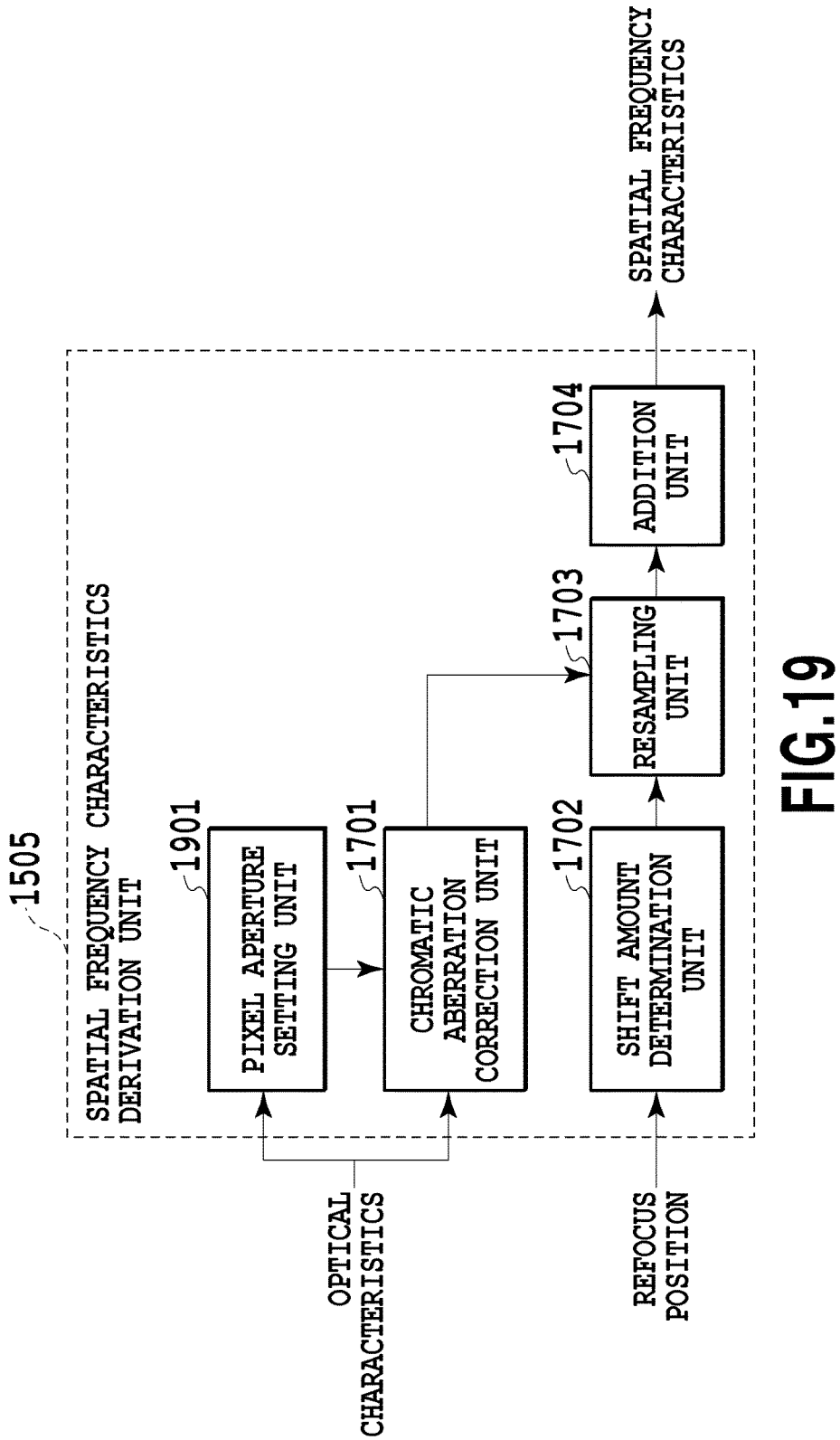
FIG. 19 is a block diagram showing a configuration example of a spatial frequency characteristics derivation unit of the first embodiment.

FIG. 19 is a block diagram showing a configuration example of the spatial frequency characteristics derivation unit 1505 in the present embodiment. The spatial frequency characteristics derivation unit 1505 includes a pixel aperture setting unit 1901, the chromatic aberration correction unit 1701, the shift amount determination unit 1702, the resampling unit 1703, and the addition unit 1704.

Figure 25A:
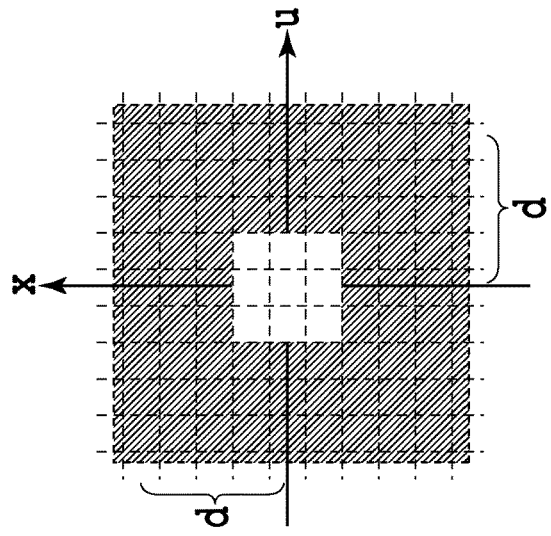
FIGS. 25A to 25C are diagrams showing a process of a change of a weight coefficient in a spatial frequency characteristics derivation unit.

The pixel aperture setting unit 1901 generates, as high-resolution light field data, a distribution of the weight coefficient of the integration in the light field space at the time of sampling of each light ray in the light field data. FIG. 25A shows an example in which light field data of a weight coefficient distribution is generated with four times the resolution for sampling intervals d of the light field data that is input. Here, the value of the white portion is 1 and the value of the gray portion is 0. In this example, for each of the x-direction and the u-direction an aperture of ¾ is possessed.

Figure 25B:
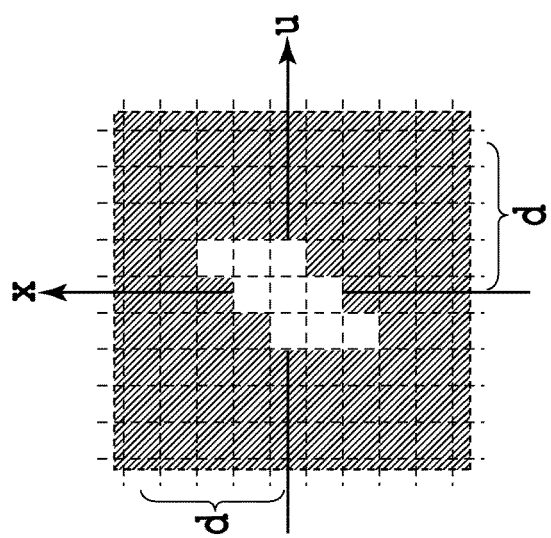
Figure 25C:
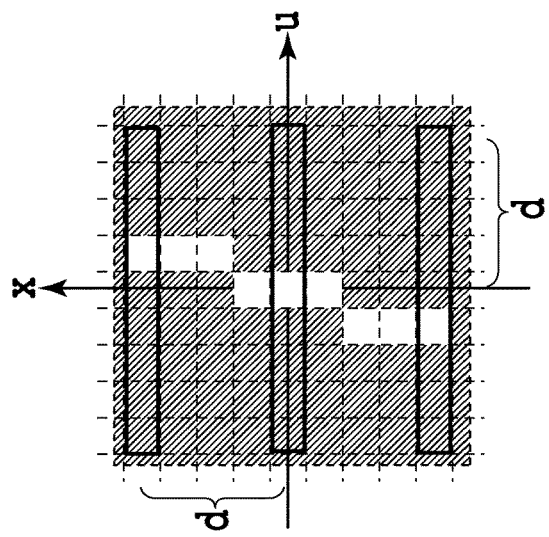

The configuration of the portion from the chromatic aberration correction unit 1701 to the addition unit 1704 is the same as the configuration in the refocus image generation unit 1504 and the distribution of the weight coefficient is transformed by regarding it as light field data and integration is performed for the light ray direction (u, v). Due to this, as the weight coefficient for each light ray passing position (x, y), the coefficient of the filter representing the spatial frequency characteristics is derived. In the example shown in FIGS. 25A to 25C, the light field data of the weight coefficient distribution is transformed from that as shown in FIG. 25A to that as shown in FIG. 25B by chromatic aberration correction and further transformed to that as shown in FIG. 25C by refocus processing. The filter coefficient is obtained by performing integration in the u-direction at the sampling position of the original resolution from the light field data shown in FIG. 25C. In FIG. 25C, the integration range is indicated by the solid line frame. It is known that the filter coefficient that is [0, 3, 0] before processing changes into [1, 1, 1]. The scale of the filter coefficient is corrected in accordance with the necessity.

Figure 20:
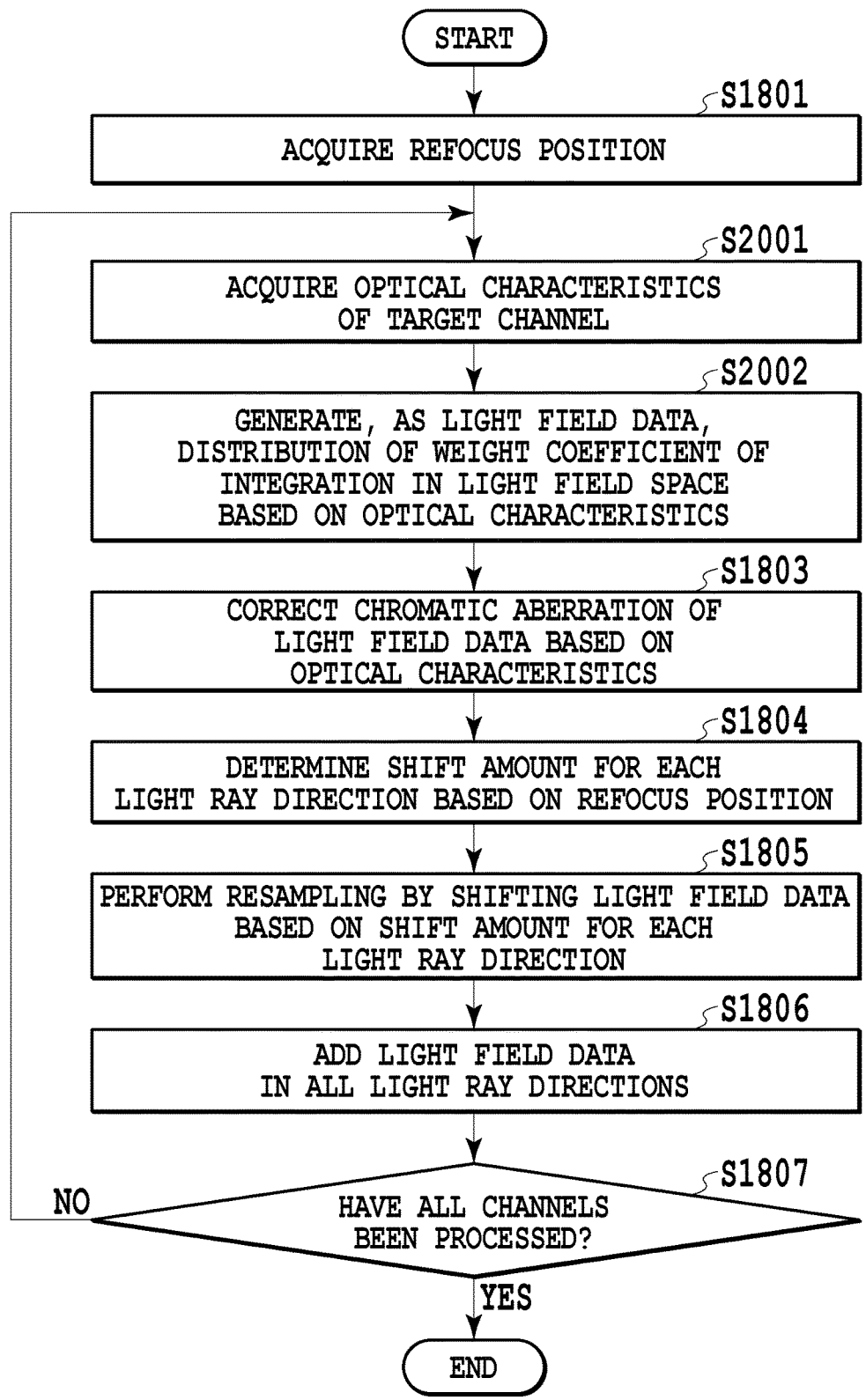
FIG. 20 is a diagram showing an example of a processing flow of spatial frequency characteristics derivation processing of the first embodiment.

Next, by using FIG. 20, an example of the processing flow of the spatial frequency characteristics derivation processing in the present embodiment is explained. Compared to the refocus image generation processing explained by using FIG. 18, in the spatial frequency characteristics derivation processing in the present embodiment, step S1802 in FIG. 18 is replaced with step S2001 and step S2002. Consequently, here, step S2001 and step S2002 are explained.

At step S2001, the pixel aperture setting unit 1901 and the chromatic aberration correction unit 1701 acquire optical characteristics of a new target channel. Here, the optical characteristics that the chromatic aberration correction unit 1701 acquires are the same as those acquired by the refocus image generation unit 1504, but the optical characteristics that the pixel aperture setting unit 1901 acquires are the focal length and the focus distance of each microlens, and the installation position and the spread of the aperture of the image capturing element.

At step S2002, the pixel aperture setting unit 1901 generates, as high-resolution light field data, a distribution of the weight coefficient of the integration in the light field space at the time of sampling of each light ray in the light field data.

Next, as in the refocus image generation processing explained by using FIG. 18, by performing the processing at step S1803 to step S1806, spatial frequency characteristics are derived.

<Configuration and Processing of Refocus Image Correction Unit>

Next, the refocus image correction processing that is performed by the refocus image correction unit 1506 at step S1608 described above is explained in more detail.

The refocus image correction unit 1506 of the present embodiment corrects a color blur by adjusting the spatial frequency characteristics derived by the spatial frequency characteristics derivation unit 1505 and making uniform the sharpness that is made to differ due to a difference in the integration range at the time of sampling of each light ray. In the present embodiment, the spatial frequency characteristics are adjusted in accordance with the channel whose sharpness is the lowest of the RGB channels.

Figure 21:
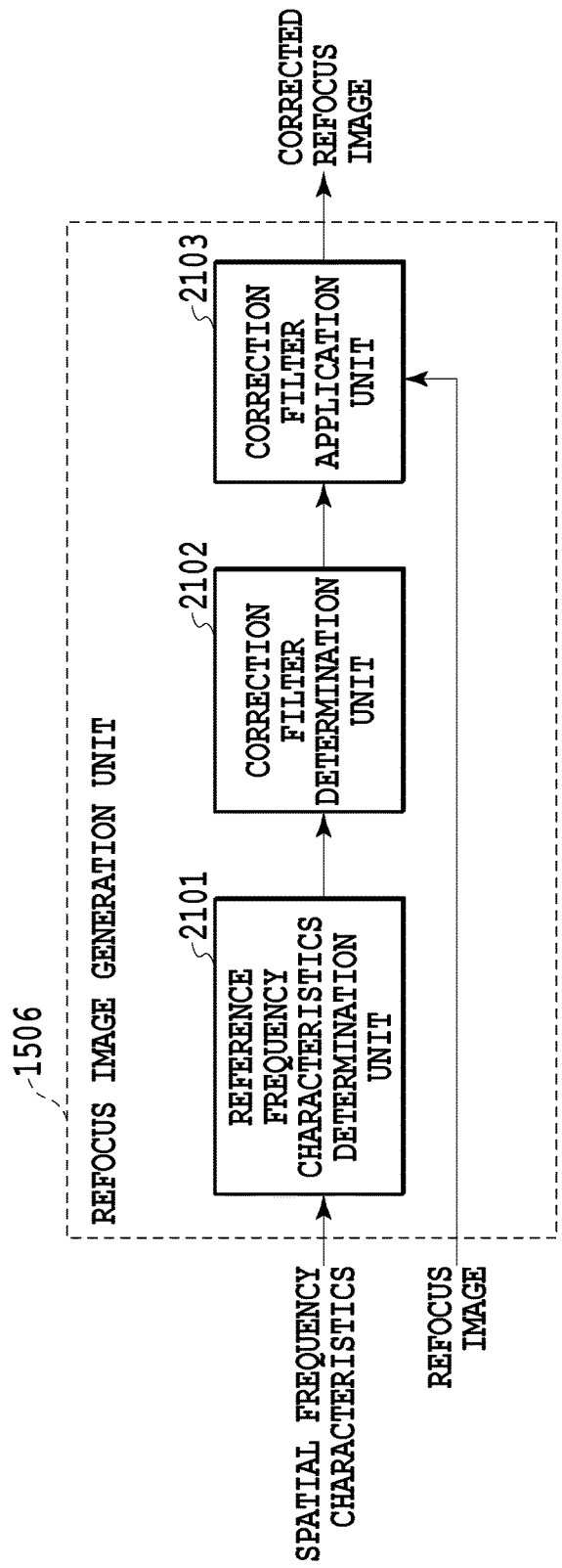
FIG. 21 is a block diagram showing a configuration example of a refocus image correction unit of the first embodiment.

FIG. 21 is a block diagram showing a configuration example of the refocus image correction unit 1506 in the present embodiment. The refocus image correction unit 1506 in the present embodiment includes a reference frequency characteristics determination unit 2101, a correction filter determination unit 2102, and a correction filter application unit 2103.

The reference frequency characteristics determination unit 2101 determines the frequency characteristics of the channel whose sharpness is the lowest to be reference frequency characteristics $f_{min}$ based on the spatial frequency characteristics of each channel. As the index of sharpness, it is possible to use the power or the like of a filter, which is obtained by applying a high-pass filter to a filter representing spatial frequency characteristics. Further, it may also be possible to use a width in which a filter simply representing spatial frequency characteristics has a value in the real space.

The correction filter determination unit 2102 determines a correction filter $f_n$ of the nth channel as expressed in expression (8) below based on the reference frequency characteristics determined by the reference frequency characteristics determination unit 2101 and the spatial frequency characteristics of each channel.

$$\hat{f}'_n = \frac{\hat{f}_{min}}{\hat{f}_n} \qquad \text{expression (8)}$$

Here, $f_n$ represents the spatial frequency characteristics of the nth channel. Further, "^" represents Fourier transformation.

The correction filter application unit 2103 corrects a refocus image by applying the correction filter $f'_n$ determined by the correction filter determination unit 2102 to the refocus image.

As an example, in the case where refocus is performed at the refocus position of $z=z_3$ at which the sharpness of the green channel becomes the highest in FIGS. 14A and 14B and it is assumed that n=0 indicates the red channel, n=1 indicates the blue channel, and n=2 indicates the green channel, each correction filter will be expressed as shown by expression (9) below.

$$\hat{f}'_0 = \frac{\hat{f}_2}{\hat{f}_0}, \quad \hat{f}'_1 = \frac{\hat{f}_2}{\hat{f}_1}, \quad \hat{f}'_2 = 1 \qquad \text{expression (9)}$$

Figure 22:
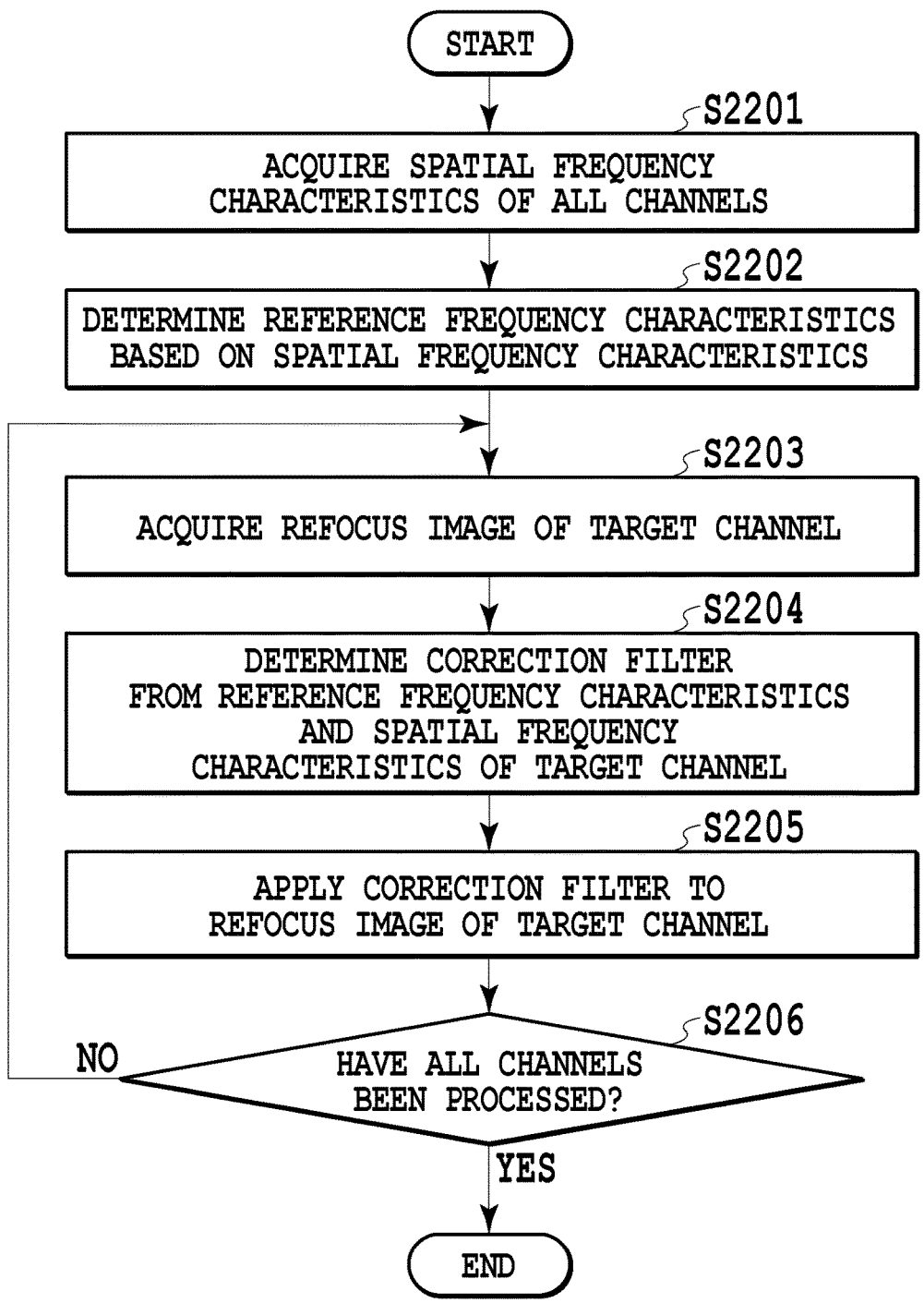
FIG. 22 is a diagram showing an example of a processing flow of refocus image correction processing of the first embodiment.

Next, by using FIG. 22, an example of the processing flow of the refocus image correction processing in the present embodiment is explained.

As step S2201, the reference frequency characteristics determination unit 2101 acquires the spatial frequency characteristics of all the channels.

At step S2202, the reference frequency characteristics determination unit 2101 determines the frequency characteristics of the channel whose sharpness is the lowest to be reference frequency characteristics based on the spatial frequency characteristics acquired at step S2201.

The processing at step S2203 to step S2206 is processing for each channel. At step S2206, whether all the channels have been processed is determined and in the case where all the channels have not been processed, the processing returns to step S2203 and the processing is repeated, and in the case where all the channels have been processed, the processing is terminated.

At step S2203, the correction filter application unit 2103 acquires a refocus image of a new correction-target channel.

At step S2204, the correction filter determination unit 2102 determines a correction filter based on the reference frequency characteristics determined at step S2202 and the spatial frequency characteristics of the correction-target channel.

At step S2205, the correction filter application unit 2103 corrects the refocus image of the correction-target channel by applying the correction filter determined at step S2204 to the refocus image of the correction-target channel acquired at step S2203.

As explained above, in the present embodiment, the correction filter determination unit 2102 determines, for each channel, the correction filter that compensates for the difference in the spatial frequency characteristics of the refocus image for each channel. Then, the correction filter application unit 2103 applies the correction filter determined for each channel by the correction filter determination unit 2102 to the refocus image of each wavelength. By doing so, it is possible to make uniform the sharpness of the refocus images of all the channels and to correct a color blur.

In the present embodiment, the configuration is such that light rays of three wavelengths, i.e., red, blue, and green light rays are acquired and a refocus image is generated, but any kind of wavelength and any number of wavelengths may be accepted as long as light rays have different wavelengths. The representation of the light field data in the present embodiment is an example and the aspect may be one different from that in which sampling is performed in the form of a square grid in the (x, y, u, v) space and the representation may be one different from that by (x, y, u, v). In the present embodiment, the microlens installation position is used as a reference of the refocus position, but any plane may be a reference of the refocus position. Further, the generation method of a refocus image shown in the present embodiment is an example and it may also be possible to use a method of performing processing in the frequency space or a method of performing resampling directly in the light field space. The derivation method of spatial frequency characteristics shown in the present embodiment is an example and it may also be possible to use an LUT (Look Up Table) of spatial frequency characteristics for a refocus position derived in advance by measurement or from design values. It may also be possible to derive spatial frequency characteristics from the refocus image of each channel. The spatial frequency characteristics may be characteristics that are uniform irrespective the pixel position of the refocus image or characteristics that depend on the pixel position. Further, the parameters, such as the refocus position and the optical characteristics, may be represented in any form as long as the parameters play equivalent roles. The correction method of a refocus image shown in the present embodiment is an example and the correction method may have any configuration in which correction is performed in accordance with the spatial frequency characteristics of the channel whose sharpness is high or the frequency characteristics set in advance. Further, the derivation method of a correction filter shown in the present embodiment is an example, and any filter that do not make uniform spatial frequency characteristics in the strict sense may be accepted as long as the filter brings about the effect of relatively making uniform spatial frequency characteristics.

As above, according to the present embodiment, it is made possible to correct a color blur caused by a difference in sharpness between each channel of a refocus image.

Second Embodiment

In the first embodiment described above, a color blur is corrected by performing correction so that the spatial frequency characteristics of each channel are made uniform by using a correction filter that compensates for a difference in spatial frequency characteristics for each channel. On the other hand, in a second embodiment, sharpness is improved while correcting a color blur by correcting the refocus image of the channel whose sharpness is low by using the high-frequency component of the refocus image of the channel whose sharpness is high as a correction component. More specifically, the refocus image correction unit 1506 in the present embodiment improves sharpness by determining the channel whose sharpness is the highest based on the spatial frequency characteristics derived by the spatial frequency characteristics derivation unit 1505 and extracting the high-frequency component and attaching the high-frequency component to another channel.

Figure 23:
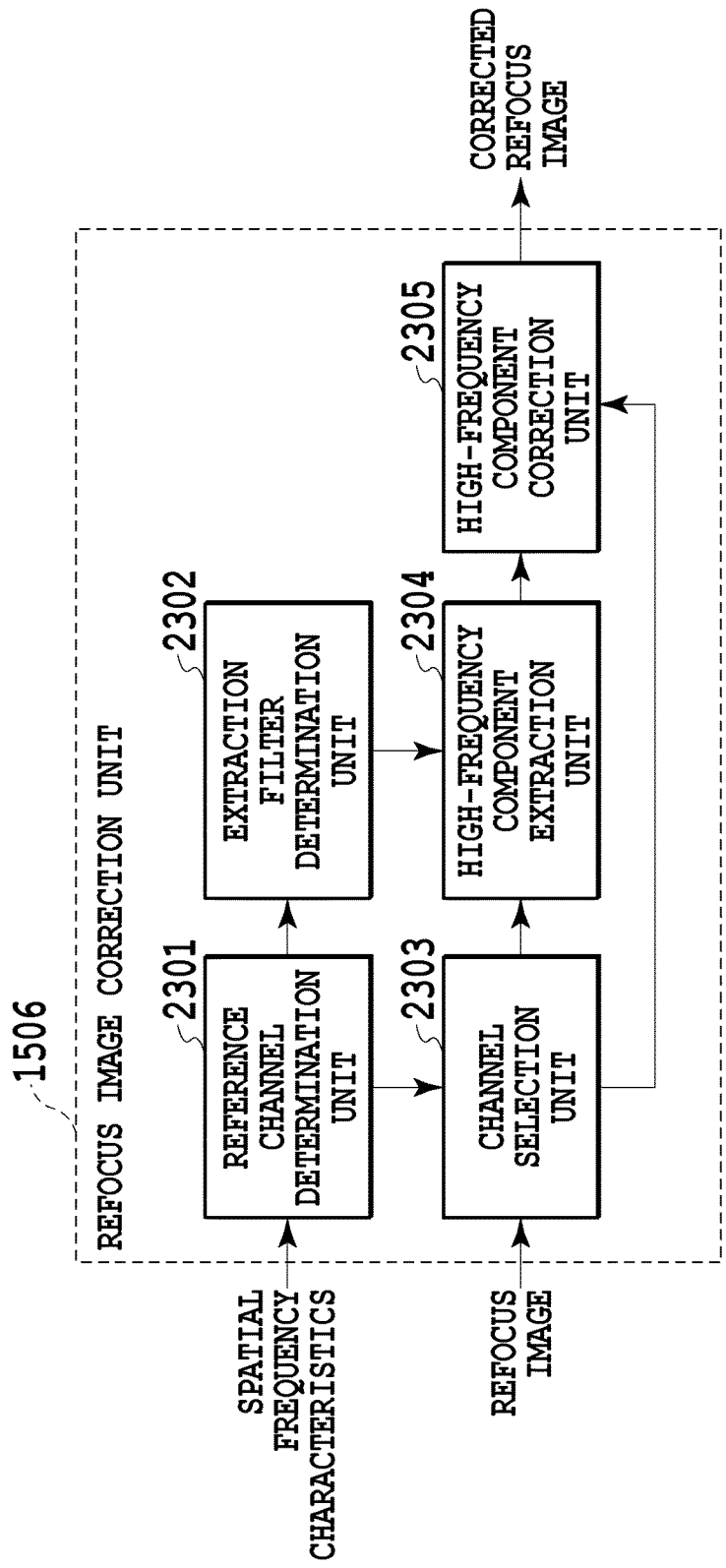
FIG. 23 is a block diagram showing a configuration example of a refocus image correction unit of a second embodiment.

FIG. 23 is a block diagram showing a configuration example of the refocus image correction unit 1506 in the present embodiment. The refocus image correction unit 1506 in the present embodiment includes a reference channel determination unit 2301, an extraction filter determination unit 2302, a channel selection unit 2303, a high-frequency component extraction unit 2304, and a high-frequency component correction unit 2305.

The reference channel determination unit 2301 determines the channel whose sharpness is the highest to be a reference channel based on the acquired spatial frequency characteristics of all the channels.

The extraction filter determination unit 2302 determines the extraction filter $f_n$ of the nth channel as expressed in expression (10) below based on the spatial frequency characteristics of the correction-target channel and the spatial frequency characteristics of the reference channel.

$$\hat{f}'_n = 1 - \frac{\hat{f}_n}{\hat{f}_{max}} \qquad \text{expression (10)}$$

Here, $f_n$ represents the spatial frequency characteristics of the nth channel and $f_{max}$ represents the spatial frequency characteristics of the reference channel.

The determined extraction filter is used to extract the high-frequency component from the refocus image of the reference channel.

The channel selection unit 2303 acquires the refocus image of the correction-target channel by selecting the correction-target channel as well as acquiring the refocus image of the reference channel.

The high-frequency component extraction unit 2304 extracts the high-frequency component by applying the extraction filter to the refocus image of the reference channel.

The high-frequency component correction unit 2305 corrects the refocus image of the correction-target channel by adding the extracted high-frequency component to the refocus image of the correction-target channel.

Figure 24:
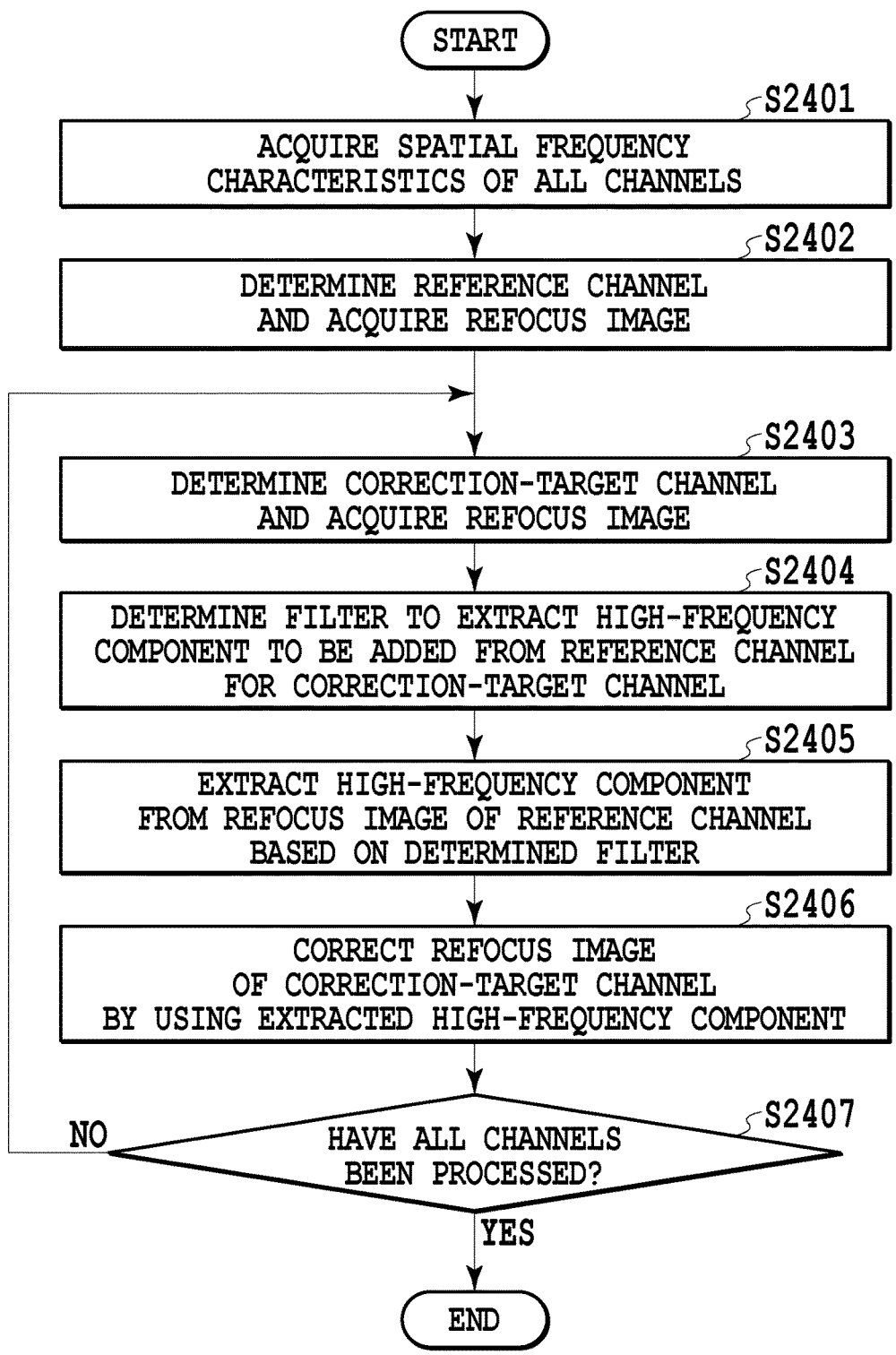
FIG. 24 is a diagram showing an example of a processing flow of refocus image correction processing of the second embodiment.

Next, by using FIG. 24, an example of the processing flow of the refocus image correction processing in the present embodiment is explained.

At step S2401, the reference channel determination unit 2301 acquires the spatial frequency characteristics of all the channels.

At step S2402, the reference channel determination unit 2301 determines the channel whose sharpness is the highest to be a reference channel based on the spatial frequency characteristics of all the channels acquired at step S2401. Further, the channel selection unit 2303 acquires the refocus image of the reference channel.

The processing at step S2403 to step S2407 is processing for each channel. At step S2707, whether all the channels have been processed is determined and in the case where all the channels have not been processed, the processing returns to step S2403 and the processing is repeated and in the case where the all the channels have been processed, the processing is terminated.

At step S2403, the channel selection unit 2303 selects a new correction-target channel and acquires a refocus image of the correction-target channel.

At step S2404, the extraction filter determination unit 2302 determines an extraction filter to extract the high-frequency component from the refocus image of the reference channel based on the spatial frequency characteristics of the reference channel determined at step S2402 and the correction-target channel.

At step S2405, the high-frequency component extraction unit 2304 extracts the high-frequency component by applying the extraction filter determined at step S2404 to the refocus image of the reference channel acquired at step S2402.

At step S2406, the high-frequency component correction unit 2305 adds the high-frequency component of the reference channel extracted at step S2405 to the refocus image of the correction-target channel acquired at step S2403. By doing so, the refocus image of the correction-target channel is corrected.

The correction method shown in the present embodiment is an example and the method may have any configuration as long as a color blur is corrected by using information on different channels based on spatial frequency characteristics.

For example, a configuration may be accepted in which information on a plurality of channels is used. Further, the channel that is used for each wavelength area of the frequency space may change.

As above, according to the present embodiment, it is made possible to improve sharpness while correcting a color blur by correcting the refocus image of the channel whose sharpness is low by using the high-frequency component of the refocus image of the channel whose sharpness is high.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to correct a color blur of a refocus image by light field data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-163772 filed Aug. 24, 2016, which is hereby incorporated by reference wherein in its entirety.

What is claimed is:

1. An image processing apparatus comprising:
   one or more processors; and
   at least one memory coupled to the one or more processors and storing instructions which, when executed by the one or more processors, cause the image processing apparatus to:
   generate a refocus image for each channel at a virtual refocus position based on light field data including a plurality of channels whose wavelengths are different and optical characteristics for each channel of an optical system used to obtain the light field data;
   derive spatial frequency characteristics for each channel from the optical characteristics for each channel and the virtual refocus position; and correct the refocus image for each channel so as to make sharpness uniform based on the spatial frequency characteristics for each channel.

2. The image processing apparatus according to claim 1, wherein in correcting the refocus image, the instructions, when executed by the one or more processors, cause the image processing apparatus to:
- determine a correction filter for each channel, which compensates for a difference in the spatial frequency characteristics for each channel; and
- apply the correction filter to the refocus image for each channel.

3. The image processing apparatus according to claim 1, wherein in correcting the refocus image, the instructions, when executed by the one ore more processors, cause the image processing apparatus to:
- extract a correction component for each channel from a refocus image of a reference channel based on the spatial frequency characteristics for each channel; and
- add the correction component for each channel to the refocus image for each channel.

4. The image processing apparatus according to claim 3, wherein
the correction component is a high-frequency component of the refocus image of the reference channel.

5. The image processing apparatus according to claim 1, wherein
the spatial frequency characteristics are uniform irrespective of a pixel position of the refocus image.

6. The image processing apparatus according to claim 1, wherein
the spatial frequency characteristics for each channel are derived further based on spatial frequency characteristics for the virtual refocus position derived in advance.

7. The image processing apparatus according to claim 1, wherein
the spatial frequency characteristics for each channel are derived further based on the refocus image for each channel.

8. An image capturing apparatus comprising:
- an optical system used to obtain light field data including a plurality of channels whose wavelengths are different and configured to acquire the light field data;
- one or more processors; and
- at least one memory coupled to the one or more processors and storing instructions which, when executed by the one or more processors, cause the image capturing apparatus to:
- generate a refocus image for each channel at a virtual refocus position based on the light field data and optical characteristics for each channel of the optical system;
- derive spatial frequency characteristics for each channel from the optical characteristics for each channel and the virtual refocus position; and
- correct the refocus image for each channel so as to make sharpness uniform based on the spatial frequency characteristics for each channel.

9. An image processing method comprising:
- generating a refocus image for each channel at a virtual refocus position based on light field data including a plurality of channels whose wavelengths are different and optical characteristics for each channel of an optical system used to obtain the light field data;
- deriving spatial frequency characteristics for each channel from the optical characteristics for each channel and the virtual refocus position; and
- correcting the refocus image for each channel so as to make sharpness uniform based on the spatial frequency characteristics for each channel.

10. A non-transitory computer readable storage medium storing a program for causing a computer to perform an image processing method, the method comprising:
- generating a refocus image for each channel at a virtual refocus position based on light field data including a plurality of channels whose wavelengths are different and optical characteristics for each channel of an optical system used to obtain the light field data;
- deriving spatial frequency characteristics for each channel from the optical characteristics for each channel and the virtual refocus position; and
- correcting the refocus image for each channel so as to make sharpness uniform based on the spatial frequency characteristics for each channel.

* * * * *